United States Patent
Kita et al.

(10) Patent No.: US 11,863,419 B2
(45) Date of Patent: Jan. 2, 2024

(54) NETWORK SERVICE MANAGEMENT SYSTEM AND NETWORK SERVICE MANAGEMENT METHOD

(71) Applicant: Rakuten Symphony Singapore Pte. Ltd., Singapore (SG)

(72) Inventors: Shinya Kita, Tokyo (JP); Puneet Devadiga, Tokyo (JP); Ajay Bukan, Tokyo (JP)

(73) Assignee: RAKUTEN SYMPHONY SINGAPORE PTE. LTD., Singapore (SG)

( * ) Notice: Subject to any disclaimer, the term of this patent is extended or adjusted under 35 U.S.C. 154(b) by 0 days.

(21) Appl. No.: 17/758,302

(22) PCT Filed: Oct. 9, 2020

(86) PCT No.: PCT/IB2020/059489
§ 371 (c)(1),
(2) Date: Jun. 30, 2022

(87) PCT Pub. No.: WO2022/074435
PCT Pub. Date: Apr. 14, 2022

(65) Prior Publication Data
US 2023/0031952 A1    Feb. 2, 2023

(51) Int. Cl.
*H04L 43/50* (2022.01)
*H04L 43/0817* (2022.01)
(52) U.S. Cl.
CPC .......... *H04L 43/50* (2013.01); *H04L 43/0817* (2013.01)

(58) Field of Classification Search
CPC .......................... H04L 43/50; H04L 43/0817
See application file for complete search history.

(56) References Cited

U.S. PATENT DOCUMENTS 7,743,090 B1 * 6/2010 Gibson ............... G06F 11/3672
709/224
10,146,524 B1 * 12/2018 Killmon .................... G06F 8/65
(Continued)

FOREIGN PATENT DOCUMENTS

JP    2011138324 A    7/2011
JP    202053711 A    4/2020

OTHER PUBLICATIONS

Case Study: Empilex "e-TEST suite", Nikkei Information Strategy, Aug. 24, 2002, No. 125, ISSN: 0917-5342, 5pp.
(Continued)

*Primary Examiner* — Philip C Lee
(74) *Attorney, Agent, or Firm* — HAUPTMAN HAM, LLP

(57) ABSTRACT

A CI/CD assist device accepts a test template in which some of fields of test content is set to a variable field in which a value is variable. An NOS sets a value compatible with a first environment in the variable field of the test template to generate test data compatible with the first environment. A test device conducts a test on a network service in the first environment by using the test data compatible with the first environment. An NOS sets a value compatible with a second environment in the variable field of the test template to generate test data compatible with the second environment. A test device conducts a test on the network service in the second environment by using the test data compatible with the second environment.

6 Claims, 28 Drawing Sheets

(56) References Cited

U.S. PATENT DOCUMENTS

| | | | | |
|---|---|---|---|---|
| 2013/0174117 | A1* | 7/2013 | Watters | G06F 8/71 |
| | | | | 717/106 |
| 2017/0177324 | A1* | 6/2017 | Frank | G06F 16/958 |
| 2019/0052551 | A1* | 2/2019 | Barczynski | H04L 41/40 |
| 2020/0311600 | A1* | 10/2020 | Kulkarni | G06F 8/71 |

OTHER PUBLICATIONS

Open Middleware-2 64bit version Business application development and operation environment for Windows that is the first to support Windows x64 for WindowsCOBOL2002(64) Hitac, Apr. 1, 2016, 5pp.

Takashi Uekariya, Municipal Solutions with Personal Number Card 6th To a foundation for the development of private Internet transactions, etc. "Public Personal Authentication Service" (No. 2), Monthly Municipal Solutions, Oct. 1, 2015, 8pp.

International Search Report in PCT Application No. PCT/IB2020/059490, dated Dec. 15, 2020, 13pp.

Ryosuke Kurebayashi et al., "Approaches to standardization of NFV", Technical Journal, Apr. 2016, vol. 24, No. 1, NTT DOCOMO, Tokyo Japan, 10pp.

Ryosuke Kurebayashi et al., "Efforts toward standardization of NFV", NTT Technical journal, Jun. 1, 2016, vol. 28, No. 6, p. 42-49, The Telecommunications Association, Tokyo Japan, 13pp.

\* cited by examiner

FIG.9

| PRODUCT CATALOG DATA |
|---|
| SERVICE CATALOG DATA |
| INVENTORY TEMPLATE DATA |
| CM TEMPLATE DATA |
| SERVICE TEMPLATE DATA |
| SLICE TEMPLATE DATA |
| MONITORING SCRIPT DATA |
| SECURITY SCRIPT DATA |
| HELM CHART DATA |
| CONTAINER IMAGE DATA |

FIG.12

| RESOURCE POOL GROUP ID | 100 |
|---|---|

| RESOURCE POOL ID | TOTAL CORE NUMBER DATA | REMAINING CORE COUNT DATA | CNF TYPE DATA |
|---|---|---|---|
| A | 200 | 5 | ... |
| B | 200 | 7 | CU, vCU, ... |
| C | 200 | 1 | vDU, ... |
| D | 200 | 3 | ... |

| FREE SERVER COUNT | 8 |
|---|---|

FIG.13

| | | |
|---|---|---|
| INVENTORY KEY | | |
| BUNDLE ID | | |
| USER ID | | |
| PURCHASE SERVICE REQUIREMENT DATA | CORRESPONDENT IP ADDRESS | |
| | MONITORED TARGET | |
| | MONITORING INTERVAL | |
| | PASSWORD | |
| FUNCTIONAL UNIT CONFIGURATION DATA | CNF TYPE DATA | |
| | HOST NAME DATA | |
| | IP ADDRESS DATA | |
| | CONTAINER CONSTITUENT DATA | CONTAINER ID |
| | | CONTAINER IMAGE ID |
| | | NECESSARY RESOURCE DATA |
| | | RESOURCE POOL GROUP ID |
| | | RESOURCE POOL ID |
| | | CONNECTED CONTAINER ID LIST |

FIG.14

| INVENTORY KEY | 00100 |
|---|---|
| BUNDLE ID | 0010 |
| USER ID | 001 |

| CORRESPONDENT IP ADDRESS | 10.5.6.8 |
|---|---|
| MONITORED TARGET | Attach COUNT |
| MONITORING INTERVAL | 5 MINUTES |
| PASSWORD | ****** |

| CNF TYPE DATA | HOST NAME DATA | IP ADDRESS DATA | CONTAINER CONSTITUENT DATA | | | | | | | |
|---|---|---|---|---|---|---|---|---|---|---|
| P-GW | PGW_xx_1 | 10.2.3.1 | ... | ... | ... | ... | ... | ... | ... | ... |
| P-GW | PGW_xx_2 | 10.2.3.2 | ... | ... | ... | ... | ... | ... | ... | ... |
| P-GW | PGW_xx_3 | 10.2.3.3 | ... | ... | ... | ... | ... | ... | ... | ... |
| IMS | IMS_xx_1 | 10.2.3.4 | ... | ... | ... | ... | ... | ... | ... | ... |
| IMS | IMS_xx_2 | 10.2.3.5 | ... | ... | ... | ... | ... | ... | ... | ... |
| IMS | IMS_xx_3 | 10.2.3.6 | ... | ... | ... | ... | ... | ... | ... | ... |
| HSS | HSS_xx_1 | 10.2.3.7 | ... | ... | ... | ... | ... | ... | ... | ... |
| HSS | HSS_xx_2 | 10.2.3.8 | ... | ... | ... | ... | ... | ... | ... | ... |
| HSS | HSS_xx_3 | 10.2.3.9 | ... | ... | ... | ... | ... | ... | ... | ... |

FIG.15

| DATA CENTER NAME | ESTIMATED BUSY LEVEL DATA |
|---|---|
| DATA CENTER A | 20,000 |
| DATA CENTER B | 10,000 |
| DATA CENTER C | 1,000 |

FIG.16

| RESOURCE POOL GROUP ID | 100 |
|---|---|

| RESOURCE POOL ID | TOTAL CORE NUMBER DATA | REMAINING CORE COUNT DATA | CNF TYPE DATA |
|---|---|---|---|
| A | 200 | 5 | ... |
| B | 200 | 7 | CU, vCU,... |
| C | 250 | 46 | vDU,... |
| D | 200 | 3 | ... |

| NUMBER OF FREE SERVER | 7 |
|---|---|

FIG.17

```
CNF PGW
  Pod1:
    container1:
      image: xxx
      CPU: xxx
      memory: xxx
      HDD: xxx
    container2:
      xxx Pod2: xxx Hostname:

```
CNF PGW
  Pod1:
    container1:
      image: xxx
      CPU: xxx
      memory: xxx
      HDD: xxx
    container2:
      xxx Pod2: xxx Hostname: PGW_xx_1

IP: 10.2.3.1
```

NETWORK SERVICE MANAGEMENT SYSTEM AND NETWORK SERVICE MANAGEMENT METHOD

RELATED APPLICATIONS

The present application is a National Phase of International Application No. PCT/IB2020/059489, filed Oct. 9, 2020.

TECHNICAL FIELD

The present disclosure relates to data processing technology, and particularly to a network service management system and a network service management method.

BACKGROUND ART

There is a known art for providing a network service by dividing an application used to provide the network service into a plurality of components (also referred to as "microservices") in units of function, developing the plurality of the components, and causing these components to work together in a network (e.g., refer to Patent Literature 1).

CITATION LIST

Patent Literature

[Patent Literature 1] JP 2020-53711 A

SUMMARY OF INVENTION

Technical Problem

Before actually providing a network service to users, it is necessary to conduct tests on the network service in a plurality of environments such as a test environment and a production environment and check that the network service properly operates. Up to now, a piece of test data that specifies test content for the network service needs to be prepared for each of different environments in which tests are conducted. This takes time and effort.

In view of the problem described above, an object of the present disclosure is to provide a technique for improving efficiency of testing conducted on a network service in a plurality of environments.

Solution to Problem

A network service management system according to an aspect of the present invention, designed to solve the problem described above, includes: an accepter structured to accept a test template equivalent to data that specifies test content for a network service, some of fields of the test content being set to a variable field in which a value is variable; a first generator structured to generate test data that specifies test content compatible with a first environment by setting a value compatible with the first environment in the variable field of the test template; a first tester structured to conduct a test on the network service in the first environment by using the test data generated by the first generator; a second generator structured to generate test data that specifies test content compatible with a second environment different from the first environment by setting a value compatible with the second environment in the variable field of the test template; and a second tester structured to conduct a test on the network service in the second environment by using the test data generated by the second generator.

A network service management method is provided according to another aspect of the present invention. By this method, a computer executes: a step to accept a test template equivalent to data that specifies test content for a network service, some of fields of the test content being set to a variable field in which a value is variable; a first generating step to generate test data that specifies test content compatible with a first environment by setting a value compatible with the first environment in the variable field of the test template; a step to conduct a test on the network service in the first environment by using the test data generated in the first generating step; a second generating step to generate test data that specifies test content compatible with a second environment different from the first environment by setting a value compatible with the second environment in the variable field of the test template; and a step to conduct a test on the network service in the second environment by using the test data generated in the second generating step.

Any desired combinations of the above-described constituent elements and converted expressions of the present disclosure in devices, computer programs, computer-readable recording media containing the computer programs, and other similar entities are still effective as aspects of the present disclosure.

Advantageous Effects of Invention

The technique of the present disclosure makes it possible to improve efficiency of testing conducted on a network service in a plurality of environments.

BRIEF DESCRIPTION OF DRAWINGS

FIG. 9 is a drawing showing an example of a data structure of a group of data generated based on a bundled file.

FIG. 12 is a drawing showing an example of resource management data.

FIG. 13 is a drawing showing an example of a data structure of planned data.

FIG. 14 is a schematic view showing an example of planned data.

FIG. 15 is a drawing showing an example of expected busy level data.

FIG. 16 is a drawing showing an example of resource management data.

FIG. 17 is a drawing showing an example of a CNFD.

FIG. 18 is a drawing showing an example of a day0 parameter.

DESCRIPTION OF EMBODIMENT

Prerequisite Technique

A technique prerequisite for an example will be described in detail with reference to FIGS. 1 to 22G.

Figure 1:
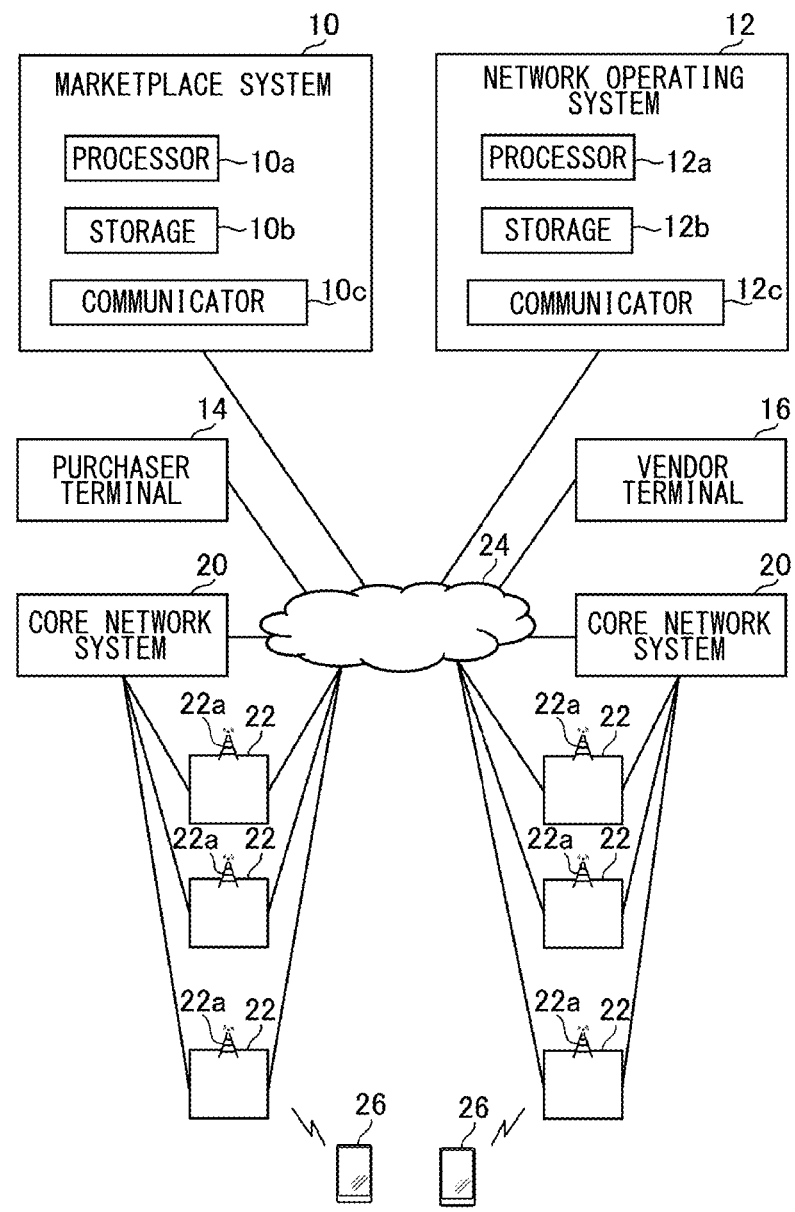
FIG. 1 is a drawing showing an example of a computer network according to an embodiment of the present invention.

FIG. 1 is a drawing showing an example of a computer network 24 according to an embodiment of the present invention. In the present embodiment, as shown in FIG. 1, a marketplace system (MPS) 10, a network operating system (NOS) 12, a purchaser terminal 14, a vendor terminal 16, a plurality of core network systems 20, and a plurality of base station apparatuses 22 are connected to the computer network 24 such as the Internet.

The core network system 20 is a system that is equivalent to the Evolved Packet Core (EPC) in fourth-generation mobile communications systems (hereinafter referred to as 4G) or the 5G Core Network (5GC) including Access and Mobility Management function (AMF), Session Management function (SMF), and User Plane function (UPF) in fifth-generation mobile communications systems (hereinafter referred to as 5G). The core network systems 20 according to the present embodiment are implemented by server groups disposed at a plurality of data centers provided at various locations. A plurality of servers is disposed at each data center. Although two core network systems 20 are shown in FIG. 1, the number of the core network systems 20 according to the present embodiment is not limited to two, but may be one, or three or greater.

The base station apparatus 22 is a computer system that is equivalent to an eNodeB (eNB) in 4G or an NR base station (gNB) in 5G and that is equipped with an antenna 22a. The base station apparatus 22 according to the present embodiment includes one or more servers. The base station apparatuses 22 may be implemented by server groups disposed at data centers.

A virtual DU (vDU) and a virtual CU (vCU), components of a radio access network (RAN), in 4G may be disposed at the base station apparatus 22 or may be built in part of the core network system 20. Similarly, a DU and a CU, components of a RAN, in 5G may be disposed at the base station apparatus 22 or may be built in part of the core network system 20.

The MPS 10 according to the present embodiment is configured, for example, on a cloud infrastructure and as shown in FIG. 1, includes a processor 10a, a storage 10b, and a communicator 10c. The processor 10a is a program-controlled device, such as a microprocessor, that operates according to a program installed in the MPS 10. The storage 10b is, for example, a storage element, such as read only memory (ROM) and random-access memory (RAM), a solid-state drive (SSD), or a hard disk drive (HDD). A program and the like run by the processor 10a is stored on the storage 10b. The communicator 10c is, for example, a communication interface such as a network interface card (NIC) and a wireless LAN module. The communicator 10c is used to send data to and receive from the NOS 12 and the purchaser terminal 14 through the computer network 24.

The NOS 12 according to the present embodiment is configured, for example, on a cloud infrastructure and as shown in FIG. 1, includes a processor 12a, a storage 12b, and a communicator 12c. The processor 12a is a program-controlled device, such as a microprocessor, that operates according to a program installed in the NOS 12. The storage 12b is, for example, a storage element, such as ROM and RAM, a solid state drive (SSD), or a hard disk drive (HDD). A program and the like run by the processor 12a is stored in the storage 12b. The communicator 12c is, for example, a communication interface such as an NIC and a wireless LAN module. The communicator 12c is used to send data to and receive from the MPS 10, the purchaser terminal 14, the vendor terminal 16, the core network systems 20, and the base station apparatuses 22 through the computer network 24.

In the present embodiment, in response to a purchase request for a network service from a purchaser, the network service for which the purchase request has been made is built on any of the core network systems 20 and the base station apparatuses 22. Then, the built network service is provided to the purchaser.

A network service such as a voice communication service and a data communication service is provided to the purchaser such as a mobile virtual network operator (MVNO), for example. Any of the voice communication service and the data communication service provided in the present embodiment is ultimately provided to a customer (an end user) of the purchaser (the MVNO in the above example) who uses user equipment (UE) 26 shown in FIG. 1. The end user can have any of voice and data communications with another user through any of the core network systems 20 and the base station apparatuses 22.

The network service provided in the present embodiment is not limited to voice communication services and data communication services. The network service provided in the present embodiment may be an Internet of things (IoT) service, for example. An end user who uses a robot arm, a connected vehicle, or other equipment may be a purchaser of a network service according to the present embodiment, for example.

In the present embodiment, an application execution environment of a container type, such as Docker, is installed in the servers disposed on the core network systems 20 and the base station apparatuses 22. Containers can be deployed and run on these servers. The network service provided to the purchaser in the present embodiment is implemented by a cloud-native network function (CNF) that is a container-based functional unit.

The purchaser terminal 14 according to the present embodiment is, for example, a general computer, such as a smartphone, a tablet terminal, and a personal computer, used by the purchaser above.

Figures 2, 3:
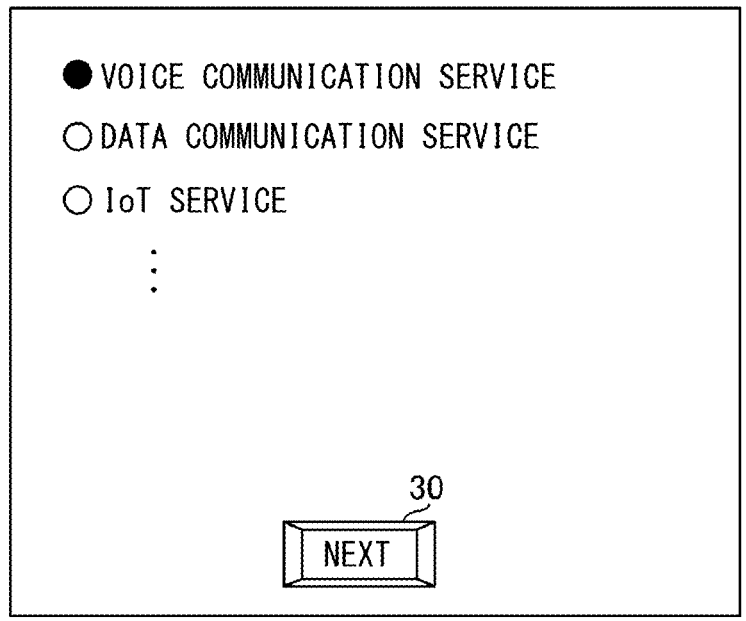
FIG. 2 is a schematic view showing an example of a purchase screen.
FIG. 3 is a drawing showing an example of a service requirement input screen.

FIG. 2 is a drawing showing an example of a purchase screen displayed on the purchaser terminal 14 according to the present embodiment. Radio buttons on the purchase screen shown in FIG. 2 allow the purchaser to select a type of a network service the purchaser is to purchase. When the purchaser designates a voice communication service and clicks a Next button 30, a service requirement input screen shown in FIG. 3 is displayed on the purchaser terminal 14.

The service requirement input screen allows the purchaser to enter service requirements for the network service the purchaser is to purchase. In an example of FIG. 3, the purchaser can set the number of subscribers, a correspondent IP address, a monitored target, a monitoring interval, a covered region, and a password. The correspondent IP address refers to an IP address that is an access point to a network system owned by the purchaser.

When the purchaser enters these service requirements and clicks the Next button 32, items of service requirement data corresponding to the requirements entered in the service requirement input screen are sent to the MPS 10.

The service requirement data, for example, includes subscriber number data showing the number of subscribers, correspondent IP data showing a correspondent IP address, monitored target data showing a target to be monitored, monitoring interval data showing intervals at which the monitored target is monitored, covered region data showing a region covered by the purchased network service, and password data showing a password. The service requirement data does not necessarily include all of these items of the data but may include an item of data showing a requirement other than these requirements.

Based on the service requirement data, the MPS 10 in coordination with the NOS 12 checks whether or not this network can reserve a server that meets the service requirements represented by the service requirement data. In this example, the MPS determines one of (1) a server that meets the service requirements can be reserved, (2) a server that meets the service requirements can be reserved by setting up a free server, and (3) a server that meets the service requirements cannot be reserved.

Figure 4:
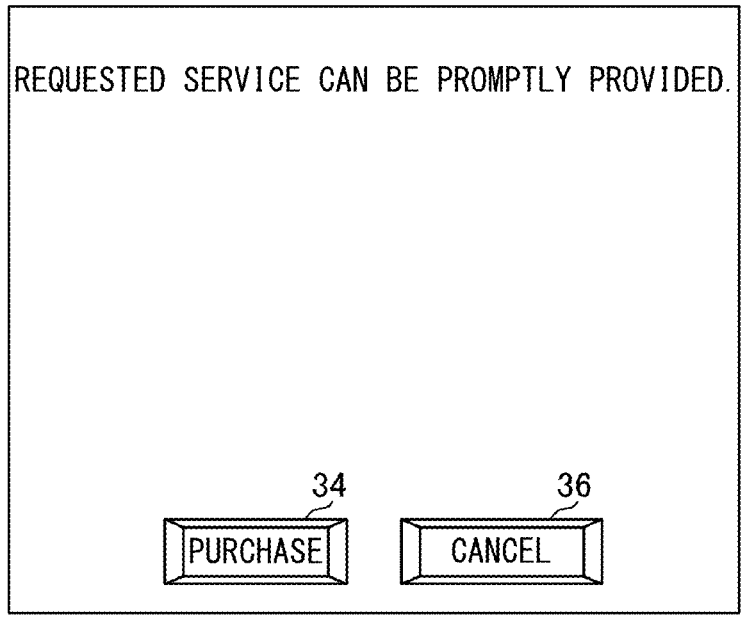
FIG. 4 is a drawing showing an example of a purchase confirmation screen.

When a result determined by the MPS is (1) or (2), the purchaser terminal 14 displays a purchase confirmation screen as shown in FIG. 4 to show that the service can be promptly provided. When the result determined by the MPS is (3), the purchaser terminal 14 displays a purchase confirmation screen as shown in FIG. 5 to show that a predetermined delivery time is required (for example, a delivery time of two weeks is required).

Figure 5:
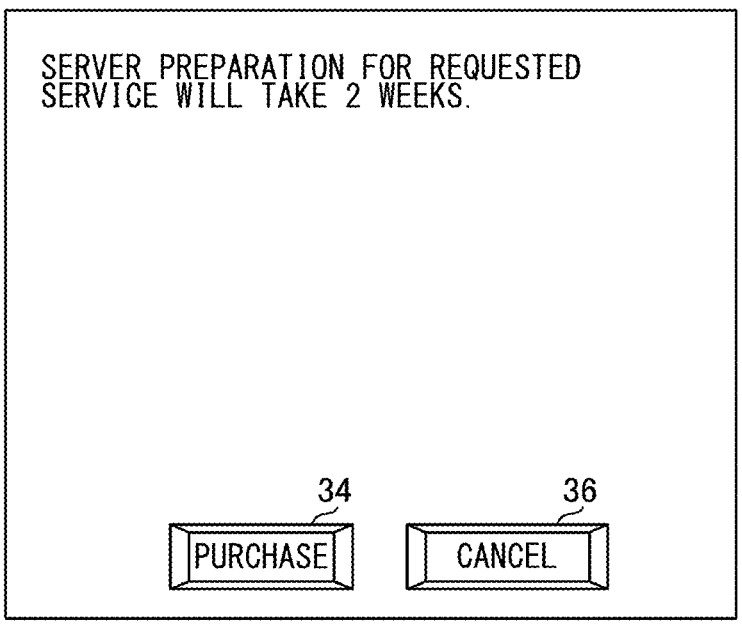
FIG. 5 is a drawing showing an example of a purchase confirmation screen.

When the purchaser then clicks a Purchase button 34 shown in FIG. 4 or 5, the network service for which the purchase request has been made is built and is provided to the purchaser.

Meanwhile, when the purchaser clicks a Cancel button 36 shown in FIG. 4 or 5, the purchase request is canceled.

As described above, according to the present embodiment, a network service that meets various needs of a purchaser is flexibly built. The purchaser can be provided with a desired network service only by specifying several service requirements without being aware of detailed implementation of the network service.

The vendor terminal 16 according to the present embodiment is, for example, a general computer, such as a smartphone, a tablet terminal, and a personal computer, used by a vendor such as a provider of a service related to a network service.

In the present embodiment, a continuous integration/continuous delivery (CI/CD) pipeline including a development environment, a verification environment, and a testing environment is provided to a vendor. In the present embodiment, through an on-boarding process using the CI/CD pipeline, a bundled file that is prepared by the vendor and that is verified is on-boarded. The bundled file is compatible with a network service that is a target provided to the purchaser.

The bundled file according to the present embodiment is a file (e.g., a tar.gz format file) into which a group of files having a predetermined directory configuration is compressed, for example.

Figure 6:
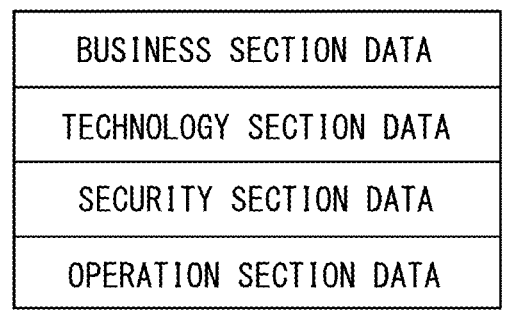
FIG. 6 is a drawing showing an example of a data structure of a bundled file.

FIG. 6 is a drawing showing an example of a data structure of a bundled file according to the present embodiment. As shown in FIG. 6, the bundled file according to the present embodiment includes business section data, technology section data, security section data, and operation section data.

The business section data shows, for example, business requirements for the network service, such as a name of the network service, a license requirement, and a definition of a service level agreement (SLA). The business section data according to the present embodiment includes data showing an essential field to be entered and an optional field to be entered about service requirements for the network service.

The technology section data shows, for example, a configuration of a functional unit group implementing the network service. The technology section data shows, for example, a configuration of an application and a CNF that make up the network service.

The security section data shows, for example, a definition of security on the network service, such as information about a qualification for installation.

The operation section data shows, for example, a monitoring policy relating to the network service, such as on metrics of a monitored target and monitoring intervals.

Figure 7:
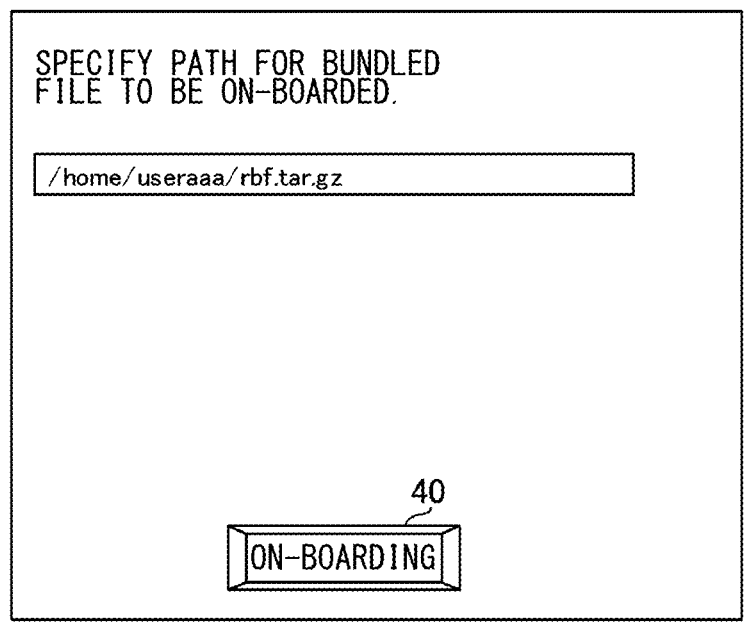
FIG. 7 is a drawing showing an example of an on-boarding screen.

FIG. 7 is a drawing showing an example of an onboarding screen displayed on the vendor terminal 16 according to the present embodiment. In the present embodiment, when the vendor specifies a path on which a bundled file is disposed and clicks an On-boarding button 40, the bundled file is on-boarded.

In the present embodiment, as described above, the vendor can readily on-board the file for the network service without being aware of an actual location where a group of developed files is on-boarded.

Functions of the MPS 10 and the NOS 12 and a process executed by the MPS 10 and the NOS 12 according to the present embodiment will be further described below.

Figure 8:
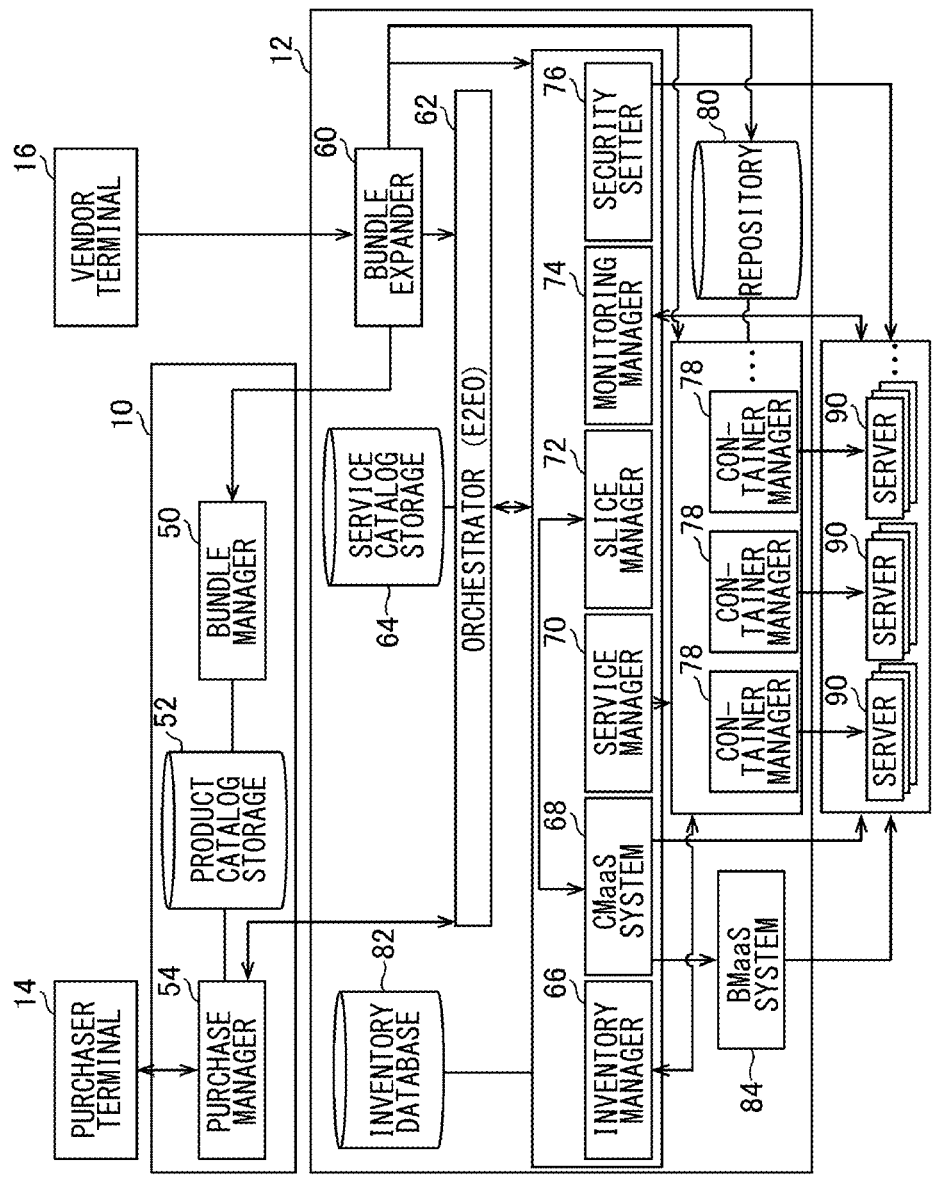
FIG. 8 is a functional block diagram showing an example of functions implemented in an MPS and an NOS according to an embodiment of the present invention.

FIG. 8 is a functional block diagram showing an example of functions implemented in the MPS 10 and the NOS 12 according to the present embodiment. In the MPS 10 and the NOS 12 according to the present embodiment, not all the functions shown in FIG. 8 may need to be implemented and a function other than the functions in FIG. 8 may be implemented.

As shown in FIG. 8, the MPS 10 includes a bundle manager 50, a product catalog storage 52, and a purchase manager 54 in terms of function, for example.

The bundle manager 50 and the purchase manager 54 are implemented primarily by the processor 10a and the communicator 10c. The product catalog storage 52 is implemented primarily by the storage 10b.

A program that includes commands associated with the above functions and that is installed in the MPS 10, which is a computer, may be executed by the processor 10a and the above functions may be thereby implemented. The program may be supplied, for example, to the MPS 10 via a computer-readable data storage medium, such as an optical disk, a magnetic disk, a magnetic tape, a magneto-optical disk, and flash memory, or others such as the Internet.

As shown in FIG. 8, the NOS 12 includes a bundle expander 60, an orchestrator (E2EO: end-to-end-orchestration) 62, a service catalog storage 64, an inventory manager 66, a configuration management as a service (CMaaS) system 68, a service manager 70, a slice manager 72, a monitoring manager 74, a security setter 76, a plurality of container managers 78, a repository 80, an inventory database 82, and a bare metal as a service (BMaaS) system 84 in terms of function, for example.

The bundle expander 60 and the E2EO 62 are implemented primarily by the processor 12a and the communicator 12c. The service catalog storage 64, the repository 80, and the inventory database 82 are implemented primarily by the storage 12b. The inventory manager 66, the CMaaS system 68, the service manager 70, the slice manager 72, the monitoring manager 74, the security setter 76, and the container managers 78 are implemented primarily by the processor 12a and the storage 12b. The BMaaS system 84 is implemented primarily by the processor 12a.

A program that includes commands associated with the above functions and that is installed in the NOS 12, which is a computer, may be executed by the processor 12a and the above functions may be thereby implemented. The program may be supplied, for example, to the NOS 12 via a computer-readable data storage medium, such as an optical disk, a magnetic disk, a magnetic tape, a magneto-optical disk, and flash memory, or others such as the Internet.

FIG. 8 also shows a plurality of servers 90 that are disposed and dispersed at various locations and that are included in the core network systems 20 and the base station apparatuses 22 shown in FIG. 1. The plurality of the container managers 78 according to the present embodiment are associated with respective server groups that are each a part of the plurality of the servers 90.

A container management tool such as Kubernetes and a package manager such as Helm, for example, are installed in each of the plurality of the container managers 78 according to the present embodiment. The container managers 78 perform container life cycle management, including building containers such as container deployment and settings, on the server groups (the plurality of the servers 90) associated with the container managers 78.

The container managers 78 are not necessarily included in the NOS 12. The container managers 78 may be disposed, for example, in the servers 90 (i.e., the core network systems 20 and the base station apparatuses 22) managed by the container managers 78 or in servers provided next to the servers 90.

In the present embodiment, the bundle expander 60 accepts, for example, a bundled file from the vendor terminal 16. In the present embodiment, based on the accepted bundled file, the bundle expander 60 generates, for example, a data group, a data structure of which is shown in FIG. 9. The data group shown in FIG. 9 is a data group in which content of the bundled file accepted by the bundle expander 60 is reconfigured.

As shown in FIG. 9, the data group generated by the bundle expander 60 includes product catalog data, service catalog data, inventory template data, CM template data, service template data, slice template data, monitoring script data, security script data, Helm chart data, and container image data.

The product catalog data is, for example, data corresponding to the business section data included in the bundled file. As described above, the product catalog data shows information concerning business requirements for the network service, such as a name of the network service, which is displayed on the purchase screen shown in FIG. 2, a license requirement, and a definition of a service level agreement (SLA).

The product catalog data according to the present embodiment also includes data showing an essential field to be entered and an optional field to be entered about service requirements for the network service. In the present embodiment, for example, based on the product catalog data, the purchase screen shown in FIG. 2 and the service requirement input screen shown in FIG. 3 are generated.

The service catalog data is, for example, data corresponding to a part of the technology section data included in the bundled file. The service catalog data includes a workflow script used to build the network service.

The service catalog data may include requirement-configuration association data showing an association between values in the service requirement data described above and a configuration of a functional unit group (e.g., a CNF group) built in response to a purchase request.

For example, the service catalog data may include requirement-configuration association data showing an association between a value in the service requirement data and each of types of a group of functional units and the number of the functional units of the types. For example, the requirement-configuration association data may show an association each between "the number of subscribers 20000 and one Packet Data Network Gateway (P-GW)", "the number of subscribers 20000 and one IP Multimedia System (IMS)", and "the number of subscribers 20000 and one Home Subscriber Server (HSS)". Items associated with the service requirement data are not limited to types and the number of 4G components. The service requirement data may be associated with types and the number of 5G components.

The requirement-configuration association data may show, for example, an association between a value in the service requirement data and a location at which each functional unit included in a functional unit group is built. The functional unit group is built in response to a purchase request. In this case, in the requirement-configuration association data, the location associated with the value in the service requirement data may differ depending on the functional unit included in the built functional unit group.

The inventory template data is, for example, data corresponding to both a part of the technology section data and a part of the security section data included in the bundled file. The inventory template data is, for example, template data showing logic used by the inventory manager 66.

The CM template data is, for example, data corresponding to both a part of the technology section data and a part of the operation section data included in the bundled file and is, for example, template data showing logic used by the CMaaS system 68.

The service template data is, for example, data corresponding to a part of the technology section data included in the bundled file and is, for example, template data showing logic used by the service manager 70.

The slice template data is, for example, data corresponding to a part of the technology section data included in the bundled file and is, for example, template data showing logic used by the slice manager 72.

The monitoring script data is, for example, data corresponding to a part of the operation section data included in the bundled file and is, for example, data showing a monitoring script run by the monitoring manager 74.

The security script data is, for example, data corresponding to a part of the security section data included in the bundled file and is, for example, data showing a script about security run by the security setter 76.

The Helm chart data is, for example, data corresponding to a part of the operation section data included in the bundled file and is data showing a script template (a Helm chart) used by the container managers 78.

The container image data is, for example, data corresponding to a part of the operation section data included in the bundled file and is, for example, container image data about a container included in the functional unit group implementing the network service. The container image data includes one or more container images. A container image ID, an identifier of a container image, is related to each of the one or more container images.

In the present embodiment, in response to acceptance of a bundled file, the bundle expander 60 determines a bundle ID related to a data group generated based on the bundled file. The bundle ID is uniquely assigned to each generated data group.

The bundle expander 60 sends product catalog data included in the data group, which is related to the bundle ID, to the MPS 10, with the product catalog data being related to the determined bundle ID.

The bundle expander 60 also relates service catalog data included in the data group to the determined bundle ID and outputs the service catalog data to the E2EO 62. Then, the E2EO 62 causes the service catalog storage 64 to store the service catalog data.

The bundle expander 60 also relates inventory template data, CM template data, service template data, slice template data, monitoring script data, security script data, Helm chart data, and container image data to the bundle ID, which is related to the data group, and causes the inventory manager 66, the CMaaS system 68, the service manager 70, the slice manager 72, the monitoring manager 74, the security setter 76, the container managers 78, and the repository 80 to store the respective items of the data.

In this way, in the present embodiment, the product catalog data, the service catalog data, the inventory template data, the CM template data, the service template data, the slice template data, the monitoring script data, the security script data, the Helm chart data, and the container image data are associated with one another by the bundle ID.

In the present embodiment, the vendor can readily provide a network service by conducting a simple operation such as specifying a path for a bundled file.

In the present embodiment, the bundle manager 50 receives, for example, the product catalog data related to the bundle ID and sent from the bundle expander 60. Then, the bundle manager 50 causes the product catalog storage 52 to store the received product catalog data.

In the present embodiment, the product catalog storage 52 stores, for example, the product catalog data related to the bundle ID as described above.

In the present embodiment, the purchase manager 54 accepts, for example, a request for network service building like a purchase request for a network service from the purchaser terminal 14. Such a purchase request is related to a bundle ID and service requirement data. The bundle ID related to the purchase request is hereinafter referred to as a purchase bundle ID, and the service requirement data related to the purchase request is referred to as purchase service requirement data.

In response to acceptance of the above purchase request, the purchase manager 54 sends the purchase service requirement data related to the purchase bundle ID to the E2EO 62.

The purchase manager 54, in coordination with the E2EO 62 and the inventory manager 66, specifies a delivery time for the network service the purchaser is to purchase.

Then, the purchase manager 54 informs the purchaser of the specified delivery time. The purchase manager 54 generates, for example, the purchase confirmation screen in which the specified delivery time is shown and sends the generated purchase confirmation screen to the purchaser terminal 14.

In the present embodiment, the inventory database 82 is, for example, a database on which inventory information about the plurality of the servers 90, which are managed by the NOS 12 and disposed on the core network systems 20 and the base station apparatuses 22, is stored.

Figure 10:
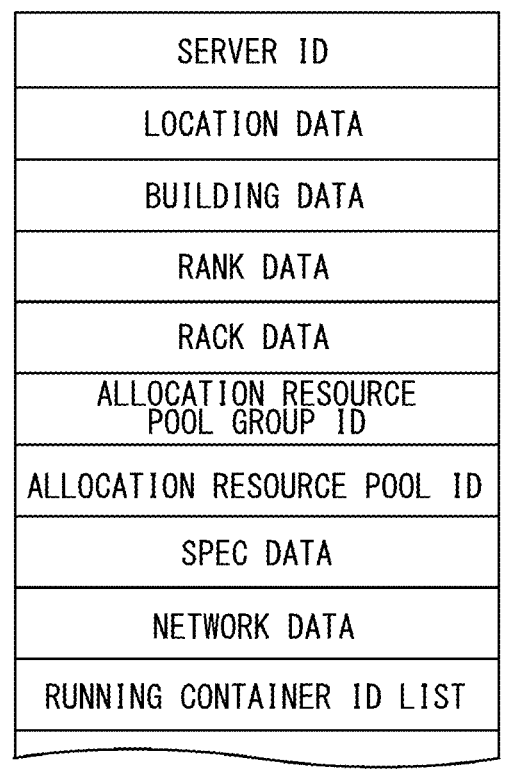
FIG. 10 is a drawing showing an example of a data structure of physical inventory data.
Figure 11:
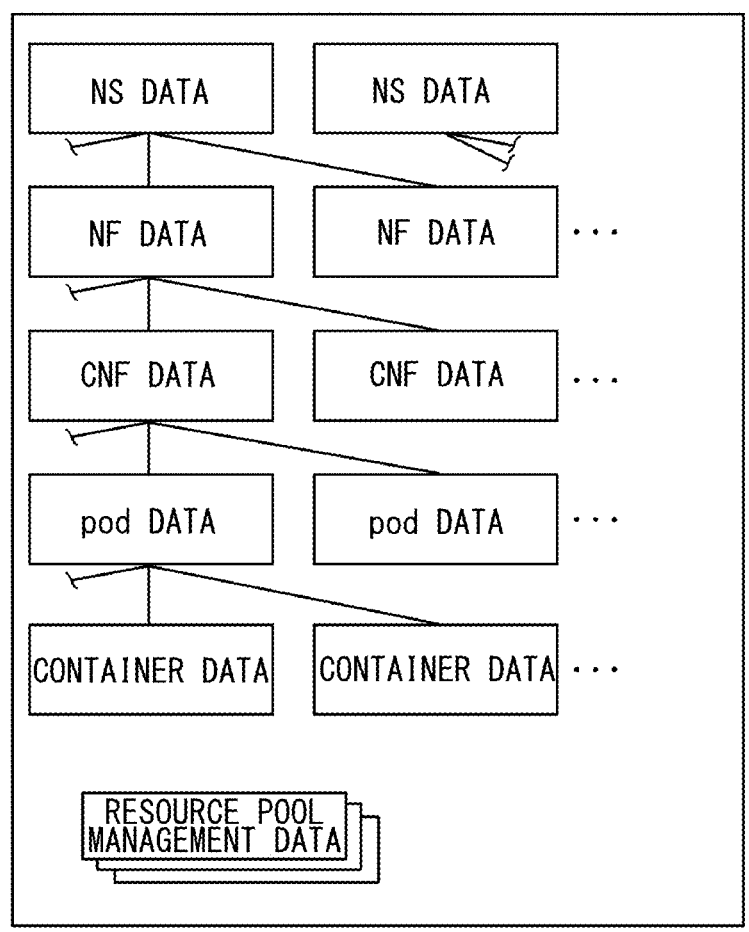
FIG. 11 is a schematic view showing an example of a data structure of logical inventory data.

In the present embodiment, inventory data including physical inventory data shown in FIG. 10 and logical inventory data shown in FIG. 11 is stored on the inventory database 82, for example. The inventory data shows a status of a resource (e.g., a status of resource usage) managed by the NOS 12.

FIG. 10 is a drawing showing an example of a data structure of the physical inventory data. The physical inventory data shown in FIG. 10 is related to any one of the servers 90. The physical inventory data shown in FIG. 10, for example, includes a server ID, location data, building data, rank data, rack data, an allocation resource pool group ID, an allocation resource pool ID, spec data, network data, and a running container ID list.

The server ID included in the physical inventory data is, for example, an identifier of the server 90 related to the physical inventory data.

The location data included in the physical inventory data is, for example, data showing a location (e.g., a location address) of the server 90 related to the physical inventory data.

The building data included in the physical inventory data is, for example, data showing a building (e.g., a name of a building) in which the server 90 related to the physical inventory data is disposed.

The rank data included in the physical inventory data is, for example, data showing a rank in which the server 90 related to the physical inventory data is disposed.

The rack data included in the physical inventory data is, for example, an identifier of a rack on which the server 90 related to the physical inventory data is disposed.

The allocation resource pool group ID included in the physical inventory data is, for example, an identifier of a resource pool group to which the server 90 related to the physical inventory data is allocated.

The allocation resource pool ID included in the physical inventory data is, for example, an identifier of a resource pool to which the server 90 related to the physical inventory data is allocated. The resource pool indicated by the allocation resource pool ID is any resource pool included in the resource pool group related to the allocation resource pool group ID. In the present embodiment, a free server is allocated to a resource pool group. However, to which resource pool included in the resource pool group the free server is allocated has not been determined yet. In the physical inventory data related to such a free server, a value of the allocation resource pool ID is set to null.

The spec data included in the physical inventory data is, for example, data showing specs of the server 90 related to the physical inventory data, such as the number of cores, a memory capacity, and a hard disk capacity of the server 90.

The network data included in the physical inventory data is, for example, data showing features such as an NIC included in the server 90 related to the physical inventory data and the number of ports included in the NIC.

The running container ID list included in the physical inventory data is, for example, data showing a list of an identifier (a container ID) of an instance of one or more containers running on the server 90 related to the physical inventory data.

FIG. 11 is a schematic view showing an example of a data structure of the logical inventory data. As shown in FIG. 11, the logical inventory data includes network service (NS) data, network function (NF) data, CNF data, pod data, and container data.

The NS data is, for example, data showing an identifier of an instance of a network service equivalent to a virtual radio access network (vRAN) or the like and a type and other attributes of the network service. The NF data is, for example, data showing an identifier of an instance of a network function equivalent to eNodeB or the like and a type and other attributes of the network function. The CNF data is, for example, data showing an identifier of an instance of a CNF equivalent to a vCU, a vDU or the like and a type and other attributes of the CNF. The pod data is, for example, data showing an identifier of an instance of a pod included in the CNF and a type and other attributes of the pod. The pod refers to a smallest unit used to manage a Docker container by Kubernetes. The container data is data showing the container ID of an instance of a container included in the pod and a type and other attributes of the container.

Data showing attributes such as a host name and an IP address may be specified in any of the data above included in the logical inventory data. The container data may include data showing the IP address of a container related to the container data, for example. The CNF data may include data showing the IP address and the host name of a CNF shown by the CNF data, for example.

The data above has a hierarchical structure. The NS data is associated with one or more pieces of NF data corresponding to one or more network functions included in a network service corresponding to the NS data. The NF data is associated with one or more pieces of CNF data corresponding to one or more CNFs included in a network function corresponding to the NF data. The CNF data is associated with one or more pieces of pod data corresponding to one or more pods included in a CNF corresponding to the CNF data. The pod data is associated with one or more pieces of container data corresponding to one or more containers included in a pod corresponding to the pod data.

The instance of a container and the server 90 on which the instance of the container is running are associated with each other by the container ID in the container data included in the logical inventory data and the container ID included in the running container ID list included in the physical inventory data.

In the present embodiment, the network service the purchaser purchases (the network service corresponding to the product catalog data) is not necessarily an equivalent of the network service corresponding to the NS data. The network service the purchaser purchases may be implemented, for example, by a group of functional units equivalent to network functions corresponding to one or more pieces of NF data or may be implemented by a group of functional units corresponding to one or more pieces of CNF data. The network service purchased by the purchaser may be implemented, for example, by a group of functional units corresponding to one or more pods or may be implemented by a group of functional units corresponding to one or more containers.

As shown in FIG. 11, the logical inventory data according to the present embodiment includes a plurality of pieces of resource pool management data corresponding to resource pool groups.

FIG. 12 is a drawing showing an example of resource pool management data according to the present embodiment. The resource pool management data shows statuses of a plurality of resource pools included in a resource pool group corresponding to the resource pool management data.

The resource pool management data shown in FIG. 12 includes a resource pool group ID, a plurality of pieces of resource pool data, and data about a free server count.

The resource pool group ID included in the resource pool management data is an identifier of the resource pool group corresponding to the resource pool management data.

The free server count data included in the resource pool management data is data showing a count of free servers allocated to the resource pool group corresponding to the resource pool management data.

The resource pool data is data showing the status of a resource pool included in the resource pool group corresponding to the resource pool management data.

As shown in FIG. 12, a resource pool ID, total core number data, remaining core count data, and CNF type data are included in the resource pool data.

The resource pool ID is an identifier of the resource pool.

The total core number data is data showing a total number of cores in the server 90 allocated to the resource pool. The total core number data is a concrete example of total resource quantity data showing a total quantity of a hardware resource included in the resource pool.

The remaining core count data is data showing a count of the remaining cores in the server 90 allocated to the resource pool. The remaining core count data is a concrete example of remaining resource quantity data showing a quantity of the remaining hardware resource included in the resource pool.

The CNF type data is data showing one or more types of CNFs associated with the resource pool. The CNF type data is a concrete example of functional unit type data showing one or more types of functional units associated with the resource pool.

In the present embodiment, a resource pool group spanning a plurality of locations may be set in advance, or a resource pool group associated with only one location may be set in advance. In any case, the resource pool group is associated with one or more locations shown in the physical inventory data.

The inventory manager 66, in coordination with the container managers 78, can understand the status of the resource as appropriate. The inventory manager 66, based on the latest status of the resource, updates the inventory data stored on the inventory database 82 as appropriate.

In the present embodiment, based on service requirement data sent from the purchase manager 54, the E2EO 62 and the inventory manager 66 specify, for example, a configuration of a functional unit group implementing a network service to be purchased.

The E2EO 62 acquires, for example, service catalog data related to a purchase bundle ID from the service catalog storage 64. The purchase bundle ID is related to the purchase service requirement data sent from the purchase manager 54. Then, the E2EO 62 runs a workflow script shown by the service catalog data.

The E2EO 62 and the inventory manager 66, based on the purchase service requirement data sent from the purchase manager 54, the service catalog data related to the purchase bundle ID, inventory template data related to the purchase bundle ID, and inventory data, generate planned data illustrated in FIGS. 13 and 14. The planned data is, for example, data showing a configuration of the functional unit group implementing the network service to be purchased. This process is triggered when the E2EO 62 runs the workflow script, and is executed, for example.

FIG. 13 is a drawing showing an example of a data structure of planned data according to the present embodiment. FIG. 14 is a schematic view showing an example of the planned data according to the present embodiment. The planned data according to the present embodiment includes an inventory key that is an identifier of the planned data. The inventory key is uniquely assigned to the planned data when the planned data is generated. The planned data includes a purchase bundle ID ("0010" in an example of FIG. 14). The planned data includes a user ID that is an identifier of a purchaser (a user) who has made a purchase request.

The planned data may include values specified in the purchase service requirement data. The planned data shown in FIGS. 13 and 14 includes a correspondent IP data value, a monitored target data value, a monitoring interval data value, and a password data value that are included in the purchase service requirement data.

In the present embodiment, the planned data includes pieces of functional unit data about functional units included in the functional unit group implementing the network service to be purchased. The functional unit data, for example, includes CNF type data showing types of the functional units, host name data showing host names, IP address data showing IP addresses, and a plurality of pieces of container constituent data corresponding to containers making up the respective functional units.

For example, the E2EO 62 may specify the number of the functional units in the built group based on the purchase service requirement data. The E2EO 62 may specify, for example, types of the functional units and the number of the functional units of the respective types in the group implementing the network service to be purchased, based on the purchase service requirement data and requirement-configuration association data included in the service catalog data. For example, when the number of subscribers shown by the service requirement data is 50000, the E2EO 62 may specify the built functional unit group to be three pieces of P-GW, three pieces of IMS, and three pieces of HSS based on the requirement-configuration association data described above.

The E2EO 62 may output data showing the types of the functional units and the number of the functional units of the respective types in the group, as well as the service requirement data, to the inventory manager 66. The inventory manager 66 may, based on the data and the inventory data, determine host names and IP addresses assigned to the functional units. In this example, host names and IP addresses may be determined so as not to duplicate host names and IP addresses that have been already used. Then, planned data including host name data showing the host names determined in this way and IP address data showing the determined IP addresses may be generated.

As described above, the E2EO 62 may, based on the purchase service requirement data, specify a location where the functional units included in the built functional unit group are built. The E2EO 62 may, for example, determine a location for the functional units included in the built functional unit group based on covered region data included in the purchase service requirement data and the requirement-configuration association data included in the service catalog data. Different locations may be determined for the functional units. As for each of the functional units, a host name and an IP address available at the location determined for the functional unit may be determined as the host name and the IP address for the functional unit. Then, planned data including host name data showing the host names determined in this way and IP address data showing the determined IP addresses may be generated.

The E2EO 62 may specify, based on the purchase service requirement data, the type of a functional unit and the number of the functional units built at each of a plurality of locations. In this case, in response to a location specified based on the purchase service requirement data, the E2EO 62 may specify the number of the functional units of the respective types built at the location. The E2EO 62 may determine the number of the functional units of the respective types built at each location, based on weights set location by location specified based on the purchase service requirement data.

The E2EO 62 may store, for example, expected busy level data shown in FIG. 15. The expected busy level data shown in FIG. 15 shows, for example, a population in an area covered by one or more cells subordinate to each of data centers associated with the estimated busy level data. Estimated busy level values in the data are an example of the weights set location by location described above.

The estimated busy level data regarding a data center for a core network system 20 shows, for example, a population in an area covered by one or more cells of base station apparatuses 22 communicating with the core network system 20.

The number of functional units deployed to a location may rise, for example, with an increase in population at the location shown by the estimated busy level data. It is assumed that a total number n of deployed vDUs is specified, for example, based on subscriber number data included in the purchase service requirement data. It is also assumed that based on covered region data included in the purchase service requirement data, a plurality of data centers to which the vDUs are deployed in a covered region, which is shown by the covered region data, are specified. In this case, based on estimated busy level values in data about the specified data centers, the vDUs in numbers into which the specified total number n of vDU is proportionally divided may be deployed to the respective data centers.

As shown in FIG. 13, the container constituent data, for example, includes a container ID, a container image ID, necessary resource data, a resource pool group ID, a resource pool ID, and a connected container ID list.

The container ID is, for example, an identifier uniquely assigned to an instance of a container related to the container constituent data, as described above.

The container image ID included in the container constituent data is, for example, set to a container image ID that is assigned to a container image of the container related to the container constituent data.

The necessary resource data is, for example, data showing a resource necessary to run the container. In the present embodiment, the inventory template data shows, for each container, a resource necessary to run the container, for example. The inventory manager 66 sets the necessary resource data to a value based on the inventory template data.

The resource pool group ID included in the container constituent data is, for example, set to a resource pool group ID value of the resource pool group to which the container related to the container constituent data is allocated. The inventory manager 66 may determine, for example, a resource pool group ID with which the container is built, based on the location determined as described above and the inventory data.

The resource pool ID included in the container constituent data is, for example, set to a resource pool ID value of the resource pool to which the container related to the container constituent data is allocated. The inventory manager 66 may determine, for example, a resource pool ID based on a type of the container and the resource pool management data.

The connected container ID list is a list of a container ID of a container connected to the container. In the present embodiment, the inventory template data shows, for each container, a type of a container connected to the container, for example. The inventory manager 66 determines, for example, a value of the connected container ID list based on the inventory template data and the inventory data.

To generate planned data, the E2EO 62, in coordination with the inventory manager 66, specifies a resource pool to which a new functional unit group is deployed, as well as a necessary resource. The E2EO 62 may specify a resource pool associated with a functional unit that is specified in response to the acceptance of a request for network service building like the acceptance of a purchase request. The E2EO 62 may specify a resource pool group based on a region covered by a purchased network service. A resource pool group may be specified, for example, based on a covered region shown by covered region data included in the purchase service requirement data. Then, the E2EO 62 may specify a resource pool to which a new functional unit is deployed, out of resource pools included in the specified resource pool group.

The E2EO 62 determines whether or not a hardware resource (in this example, a server 90) to which the new functional unit group is deployed can be reserved. In this example, the E2EO 62 determines one of (1) a server 90 can be reserved, (2) a server 90 can be reserved by setting up an unassigned hardware resource (in this example, a free server) that is not included in any resource pool, and (3) a server 90 cannot be reserved.

In a case of (2), the E2EO 62 determines whether or not a predetermined functional unit of a specific type can be deployed to the unassigned hardware resource (in this example, the free server).

If the functional unit of the specific type is deployed, the E2EO 62 specifies a resource pool associated with the functional unit of the specific type. In this example, the resource pool is specified based on the resource pool management data.

In the present embodiment, the container constituent data items are set to, for example, a resource pool group ID of the resource pool group specified as described above and a resource pool ID of the specified resource pool.

In the present embodiment, based on a configuration of a functional unit group specified as described above and template data that is enabled to accept the configuration as a parameter, the CMaaS system 68, the service manager 70, and the slice manager 72 specify, for example, a procedure for building the functional unit group. The building procedure, for example, includes a procedure for container configuration management such as deploying a container and configuring settings on the deployed container and a container related to the container. This process is triggered when the E2EO 62 runs the workflow script, and is executed, for example.

Then, the CMaaS system 68, the service manager 70, the slice manager 72, and the container managers 78 conduct the specified building procedure and thereby build the functional unit group. This process is also triggered when the E2EO 62 runs the workflow script, and is executed, for example.

Each functional unit included in the functional unit group may be built at a location specified for the functional unit.

In the group, functional units in a number that is specified based on the purchase service requirement data may be built, for example.

Functional units that are, for example, of a type and in a number specified for each of a plurality of locations may be built at each of the locations.

The CMaaS system 68 and the BMaaS system 84 reserve, for example, a hardware resource (in this example, a server 90) to which the new functional unit group is deployed.

The CMaaS system 68 and the BMaaS system 84 set up system software compatible with the functional unit of a specific type on an unassigned hardware resource. In the present embodiment, a script (e.g., Ansible script) used to perform the setup concerning the functional unit of the specific type is stored, for example, in the CMaaS system 68 or the BMaaS system 84. In the script, a procedure for installing a host OS that is a container execution environment platform and that is of a specific type or a specific version, a host OS kernel setting procedure, and a Basic Input Output System (BIOS) setting procedure, for example, are described. Then, the BMaaS system 84 runs the script to set up the system software compatible with the functional unit of the specific type on a free server. For example, a setup of the container execution environment host OS and BIOS is performed on the free server.

The CMaaS system 68 and the BMaaS system 84 update the resource pool management data and add the unassigned hardware resource on which the system software has been set up to the specified resource pool. Such addition of a hardware resource to the resource pool is detected by the container manager 78 that manages the hardware resource. Then, the inventory manager 66 updates the inventory data related to the added hardware resource (the server 90). In this way, the resource pool includes the hardware resource on which the system software compatible with the functional unit of the specific type has been set up.

In this example, a vDU is a functional unit of a specific type. It is also assumed that the number of cores necessary for the vDU is five and the number of cores in the free server is 50.

In this case, when a network service including the vDU is purchased, a resource pool associated with the vDU is specified. In an example of FIG. 12, the resource pool with a resource pool ID of C is specified. Then, whether or not the remaining hardware resource of the resource pool is satisfactory is checked. When the remaining hardware resource is unsatisfactory, system software compatible with the vDU is set up on one free server. Then, the server 90 on which the system software has been set up is added to the resource pool C, and the resource pool management data is updated to data shown in FIG. 16.

In this way, in the present embodiment, on a hardware resource included in a resource pool corresponding to the resource pool data, system software compatible with functional units of one or more types associated with the resource pool is set up.

In some cases, general-purpose servers having a general configuration cannot offer satisfactory performance depending on the type of the functional unit. Hence, it is preferred that system software for host OS, BIOS, and other systems that is designed specifically for functional units of such a specific type be set up on a hardware resource such as a server. In this case, it is conceivable that only a predetermined number of hardware resources on which such specifically-designed system software is set up may be prepared in advance of the start of providing a network service, and a functional unit of the type may be deployed to the prepared hardware resource as needed.

However, before the start of providing a network service, it is difficult to estimate an optimum quantity of hardware resources on which system software compatible with the functional unit of the specific type is to be set up in advance. If system software compatible with the functional unit of the specific type is set up on many hardware resources to provide a margin, some of the resources are wasted because other functional units are not suited to be deployed to such hardware resources.

In the present embodiment, as described above, when a functional unit of a specific type is deployed to an unassigned hardware resource, system software compatible with the functional unit of the specific type is set up on the unassigned hardware resource. Then, the unassigned hardware resource, on which the system software has been set up, is added to a resource pool associated with the functional unit of the specific type.

In this way, the technique according to the present embodiment enables efficient use of a hardware resource to which a functional unit of every type implementing a network service is deployed.

In the present embodiment, a functional unit may be specified based on a result of demand forecasting. A functional unit forecast to be inadequate in the near future based on a result of demand forecasting may be specified, for example. A resource pool associated with the functional unit specified in this way may be specified. Then, an unassigned hardware resource on which system software compatible with the functional unit has been set up may be added to the resource pool.

When the hardware resource to which the new functional unit group is to be deployed is reserved, the service manager 70, for example, instructs the container managers 78 to deploy the new functional unit group based on the planned data described above and service template data that is stored on the service manager 70 and related to the purchase bundle ID. The service template data is data that is enabled to accept a part or all of the planned data as a parameter.

In one example, the service template data describe above is a CNF descriptor (CNFD). FIG. 17 is a drawing showing an example of a CNFD. The service manager 70, based on the planned data and the CNFD, generates, for example, a day0 parameter (a CNF instance) shown in FIG. 18. The day0 parameter in which the CNFD host name and IP address shown in FIG. 17 are set to values shown in FIG. 18 is generated, for example.

The CNFD may include templates corresponding to a plurality of deployment flavors. The service manager 70 may generate, for example, a day0 parameter based on a template corresponding to a deployment flavor that suits the purchase service requirement data.

The service manager 70 may specify a location to which the day0 parameter is output. For example, one or more container managers 78 that are each a destination to which the corresponding day0 parameter is output may be specified. The service manager may specify, for example, a container manager 78 associated with the server 90 that is disposed at a location in the resource pool shown in the container constituent data of the planned data. Then, the service manager may generate a day0 parameter output to each of the specified locations. For example, a day0 parameter output to each of one or more container managers 78 that are each a destination may be generated.

The service manager 70 outputs each of the one or more generated day0 parameters to the corresponding container manager 78 that is a destination location to which the corresponding day0 parameter is output. The purchase bundle ID is related to the day0 parameter.

The container manager 78, based on the accepted day0 parameter, deploys the new functional unit group. The container manager 78 specifies, for example, a container image that is deployed and a resource pool to which a container is deployed, based on Helm chart data related to the purchase bundle ID as well as the accepted day0 parameter. The container manager 78 acquires the container image from the repository 80 and deploys the container related to the container image to the specified resource pool. In this example, a manifest file is generated based on the Helm chart data related to the purchase bundle ID and the received day0 parameter. Then, deployment of the container is executed using the manifest file.

The CMaaS system 68, for example, based on the planned data described above and CM template data stored on the CMaaS system 68 and related to the purchase bundle ID, generates planned CM data including a day1 parameter. The CM template data is data that is enabled to accept a part or all of the planned data as a parameter.

The day1 parameter shows, for example, a configuration management procedure including settings for a deployed functional unit group and at least one functional unit related to the functional unit group (e.g., a functional unit communicating with the deployed functional unit group). The day1 parameter concerning the base station apparatuses 22 shows, for example, a radio field intensity, a direction and an angle of the antenna 22a, and a serial number. The day1 parameter concerning the Serving Gateway (S-GW) shows, for example, information about a correspondent node (information about the Mobility Management Entity (MME) of an opposite communication party, an Access Point Name (APN), etc.) and a host name or an FQDN of a Remote Authentication Dial In User Service (RADIUS) server.

The CMaaS system 68 performs configuration management such as configuring functional unit settings based on the day1 parameter included in the generated planned CM data. This process is triggered when the E2EO 62 runs the workflow script, and is executed, for example.

The slice manager 72 instantiates, for example, a network slice concerning the network service to be purchased, based on the planned data described above and slice template data stored on the slice manager 72 and related to the purchase bundle ID. The slice template data is data that is enabled to accept a part or all of the planned data as a parameter. This process is triggered when the E2EO 62 runs the workflow script, and is executed, for example.

The slice manager 72 may give the CMaaS system 68 an instruction for configuration management relating to instantiation of the network slice. Then, the CMaaS system 68 may perform configuration management such as configuring settings in conformity with the configuration management instruction.

In this example, the CMaaS system 68 may perform configuration management relating to the new functional unit group when the deployment of the new functional unit group ends and subsequently perform configuration management relating to instantiation of the network slice.

Alternatively, the CMaaS system 68 may update the generated day1 parameter once, based on the configuration management instruction given by the slice manager 72. Then, the CMaaS system 68 may perform configuration management relating to the new functional unit group and the instantiation of the network slice in one go.

In the present embodiment, the monitoring manager 74 specifies, for example, a monitoring policy shown by the purchase service requirement data, based on the planned data described above and monitoring script data stored on the monitoring manager 74 and related to the purchase bundle ID. The monitoring manager 74 implements a monitoring setting in conformity with the specified monitoring policy. Then, the monitoring manager 74 monitors the built functional unit group in conformity with the specified monitoring policy. In this example, a monitored target shown by the purchase service requirement data may be monitored at monitoring intervals shown by the purchase service requirement data. This process is triggered when the E2EO 62 runs the workflow script, and is executed, for example.

The monitoring manager 74 may deploy, for example, sidecar to output a log on values of the metrics of the monitored object, which are associated with the container that is monitored, at the monitoring intervals described above. The side car may output the log to the monitoring manager 74 in conformity with the monitoring setting described above. The monitoring manager 74 may accumulate the log. The monitoring manager 74 may send, for example, the log to the purchaser terminal 14 in response to a request from the purchaser terminal 14.

In the present embodiment, the security setter 76 implements, for example, a security setting such as a password setting in conformity with a value in the purchase service requirement data, based on the planned data described above and security script data stored on the security setter 76 and related to the purchase bundle ID.

Figure 19A:
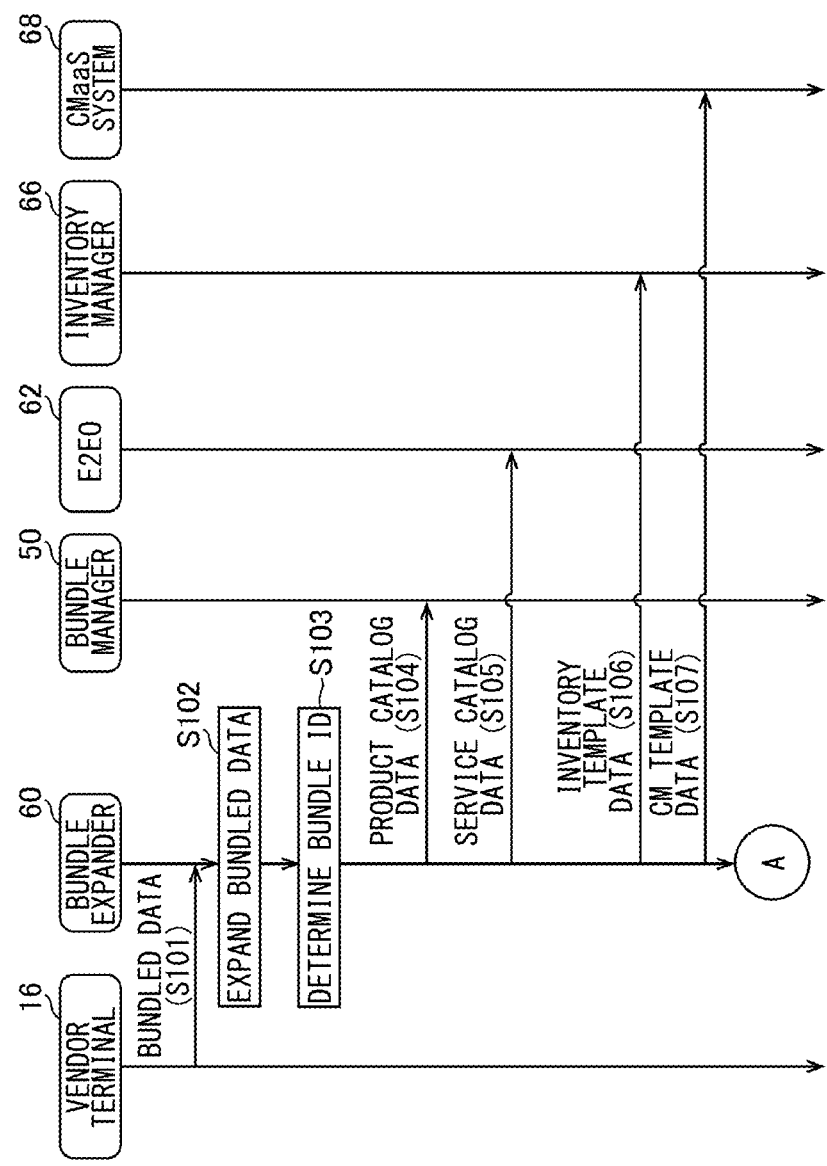
FIG. 19A is a flow diagram showing an example of a process executed by a vendor terminal, an MPS, and an NOS according to an embodiment of the present invention.
Figure 19B:
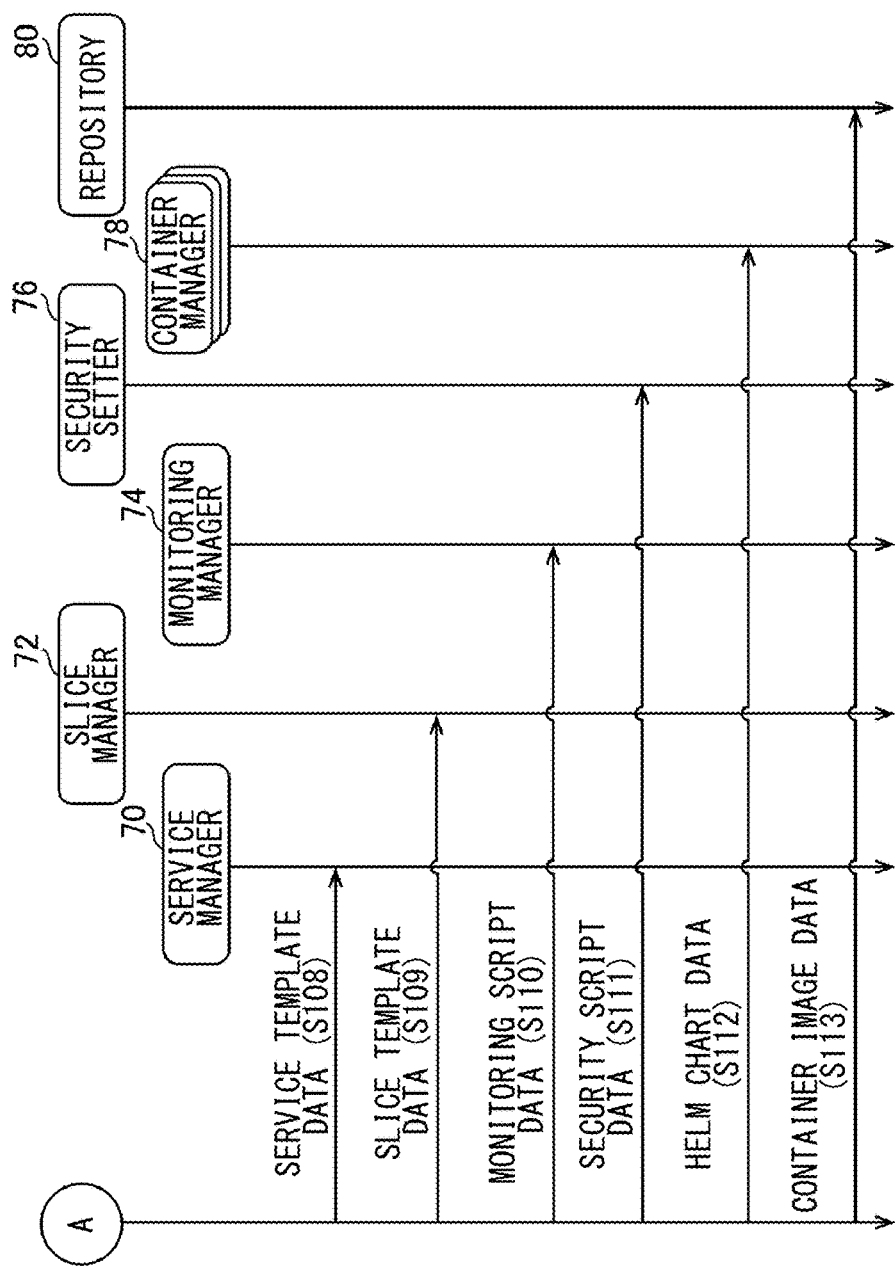
FIG. 19B is a flow diagram showing an example of a process executed by a vendor terminal, an MPS, and an NOS according to an embodiment of the present invention.

With reference to flow diagrams shown in FIGS. 19A and 19B, a process executed by the vendor terminal 16, the MPS 10, and the NOS 12 when the vendor clicks the On-boarding button 40 on the on-boarding screen shown in FIG. 7 will now be described.

First, the vendor terminal 16 sends bundled data, which is disposed on the path specified on the on-boarding screen, to the bundle expander 60 of the NOS 12 (S101).

The bundle expander 60 expands the bundled data received in the step indicated with S101 and generates a data group shown in FIG. 9 (S102).

The bundle expander 60 determines a bundle ID related to the data group shown in step S102 (S103).

The bundle expander 60 sends product catalog data included in the data group shown in step S102 to the bundle manager 50 of the MPS 10, with the product catalog data being related to the bundle ID determined in the step indicated with S103. Receiving the product catalog data, the bundle manager 50 of the MPS 10 causes the product catalog storage 52 to store the received product catalog data (S104).

The bundle expander 60 outputs service catalog data included in the data group shown in step S102 to the E2EO 62, with the service catalog data being related to the bundle ID determined in the step indicated with S103. Receiving the service catalog data, the E2EO 62 causes the service catalog storage 64 to store the received service catalog data (S105).

The bundle expander 60 causes the inventory manager 66 to store inventory template data that is included in the data group shown in step S102, with the inventory template data being related to the bundle ID determined in the step indicated with S103 (S106).

The bundle expander 60 causes the CMaaS system 68 to store CM template data that is included in the data group shown in step S102, with the CM template data being related to the bundle ID determined in the step indicated with S103 (S107).

The bundle expander 60 causes the service manager 70 to store service template data that is included in the data group shown in step S102, with the service template data being related to the bundle ID determined in the step indicated with S103 (S108).

The bundle expander 60 causes the slice manager 72 to store slice template data that is included in the data group shown in step S102, with the slice template data being related to the bundle ID determined in the step indicated with S103 (S109).

The bundle expander 60 causes the monitoring manager 74 to store monitoring script data that is included in the data group shown in step S102, with the monitoring script data being related to the bundle ID determined in the step indicated with S103 (S110).

The bundle expander 60 causes the security setter 76 to store security script data that is included in the data group shown in step S102, with the security script data being related to the bundle ID determined in the step indicated with S103 (S111).

The bundle expander 60 causes the container manager 78 to store Helm chart data that is included in the data group shown in step S102, with the Helm chart data being related to the bundle ID determined in the step indicated with S103 (S112). In this example, the bundle expander 60 may cause the plurality of the container managers 78 to store a Helm chart that is included in the data group shown in step S102. A piece of the Helm chart data corresponding to a container manager 78 may be stored on the container manager 78.

The bundle expander 60 causes the repository 80 to store container image data that is included in the data group shown in step S102, with the container image data being related to the bundle ID determined in the step indicated with S103 (S113). This ends the process shown in this process example.

Figure 20:
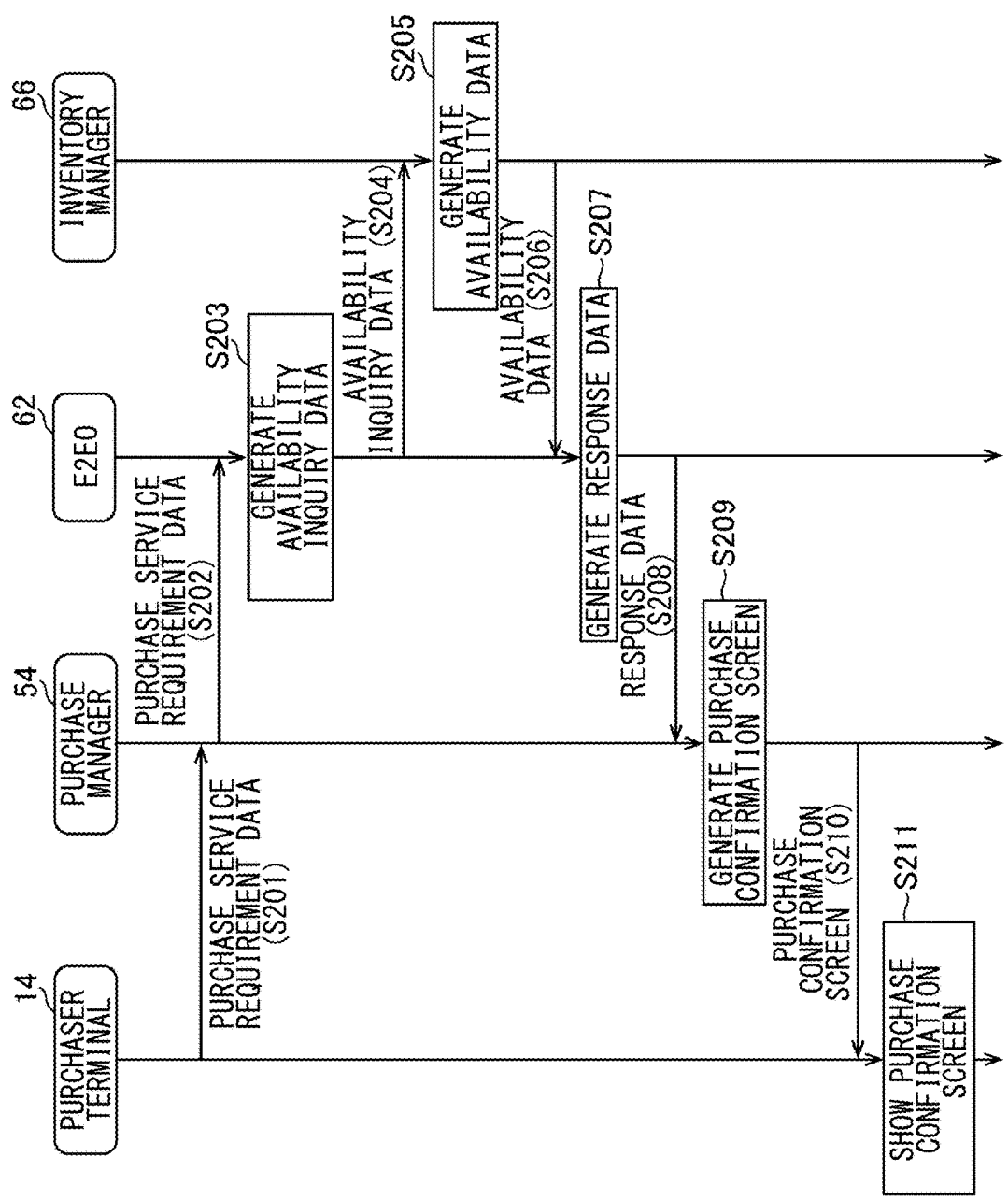
FIG. 20 is a flow diagram showing an example of a process executed by a purchaser terminal, an MPS, and an NOS according to an embodiment of the present invention.

With reference to a flow diagram shown in FIG. 20, a process executed by the purchaser terminal 14, the MPS 10, and the NOS 12 when the purchaser clicks the Next button 32 on the service requirement input screen shown in FIG. 3 will be described below.

First, the purchaser terminal 14 sends purchase service requirement data related to a purchase bundle ID to the purchase manager 54 of the MPS 10 (S201). The purchase bundle ID is a bundle ID of a network service selected by the purchaser on the purchase screen shown in FIG. 2. The purchase service requirement data is service requirement data showing requirements entered in the service requirement input screen shown in FIG. 3.

Then, receiving the purchase service requirement data related to the purchase bundle ID in the step indicated with S201, the purchase manager 54 of the MPS 10 sends the received data to the E2EO 62 of the NOS 12 (S202).

Then, the E2EO 62 of the NOS 12 generates availability inquiry data based on service catalog data related to the purchase bundle ID (S203). In this example, the E2EO 62 generates availability inquiry data that shows types of functional units and the number of the functional units of the respective types in the functional unit group implementing the network service to be purchased.

The E2EO 62 outputs the availability inquiry data generated in the step indicated with S203 to the inventory manager 66 (S204).

Then, accepting the availability inquiry data, the inventory manager 66 generates data about the availability based on the accepted inquiry data, inventory data, and inventory template data (S205). In this example, regarding a hardware resource to which the functional unit group shown in the accepted availability inquiry data is deployed, the inventory manager generates data about the availability showing one of (1) a hardware resource can be reserved, (2) a hardware resource can be reserved by adding a free server to the resource pool, and (3) a hardware resource cannot be reserved.

The inventory manager 66 sends the data about the availability, which is generated in the step indicated with S205, to the E2EO 62 (S206).

Then, receiving the availability data in the step indicated with S206, the E2EO 62 generates response data based on the received availability data (S207). In this example, when the availability data shows the above (1) or (2), response data showing OK is generated. When the availability data shows the above (3), response data showing NG is generated.

The E2EO 62 sends the response data generated in the step indicated with S207 to the purchase manager 54 of the MPS 10 (S208).

Then, receiving the response data in the step indicated with S208, the purchase manager 54 generates a purchase confirmation screen based on the received response data (S209). In this example, when the received response data shows OK, the purchase manager generates, as shown in FIG. 4, a purchase confirmation screen showing that the service can be promptly provided. Meanwhile, when the received response data shows NG, the purchase manager generates, as shown in FIG. 5, a purchase confirmation screen showing that a predetermined delivery time is required (for example, a delivery time of two weeks is required).

The purchase manager 54 sends the purchase confirmation screen generated in the step indicated with S209 to the purchaser terminal 14 (S210).

Receiving the purchase confirmation screen in the step indicated with S210, the purchaser terminal 14 shows the received purchase confirmation screen on a display of the purchaser terminal 14 (S211). This ends the process shown in this process example.

Figure 21:
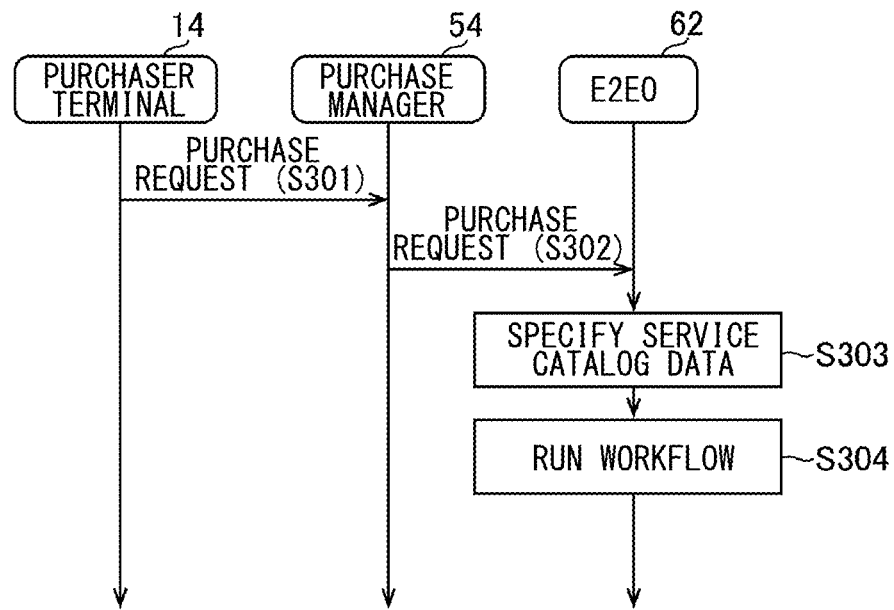
FIG. 21 is a flow diagram showing an example of a process executed by a purchaser terminal, an MPS, and an NOS according to an embodiment of the present invention.
Figure 22A:
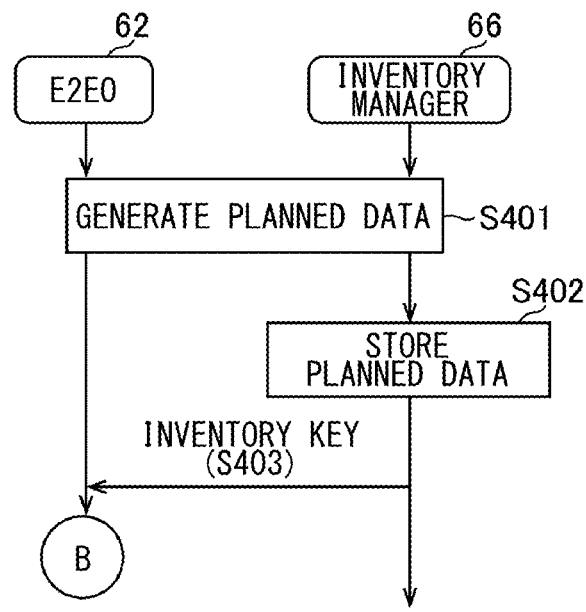
FIG. 22A is a flow diagram showing an example of a process executed by an NOS according to an embodiment of the present invention.
Figure 22B:
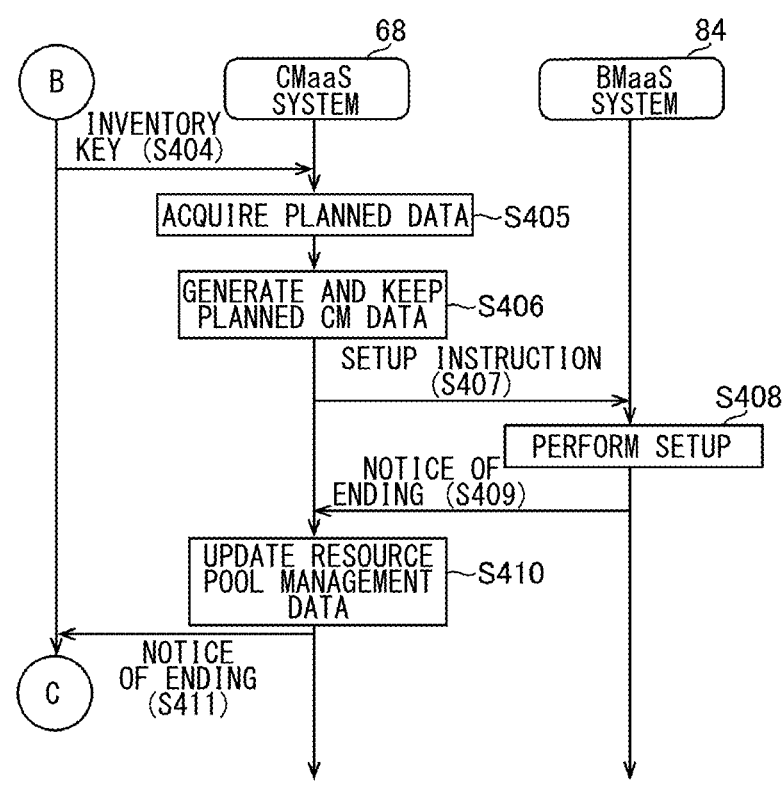
FIG. 22B is a flow diagram showing an example of a process executed by an NOS according to an embodiment of the present invention.
Figure 22C:
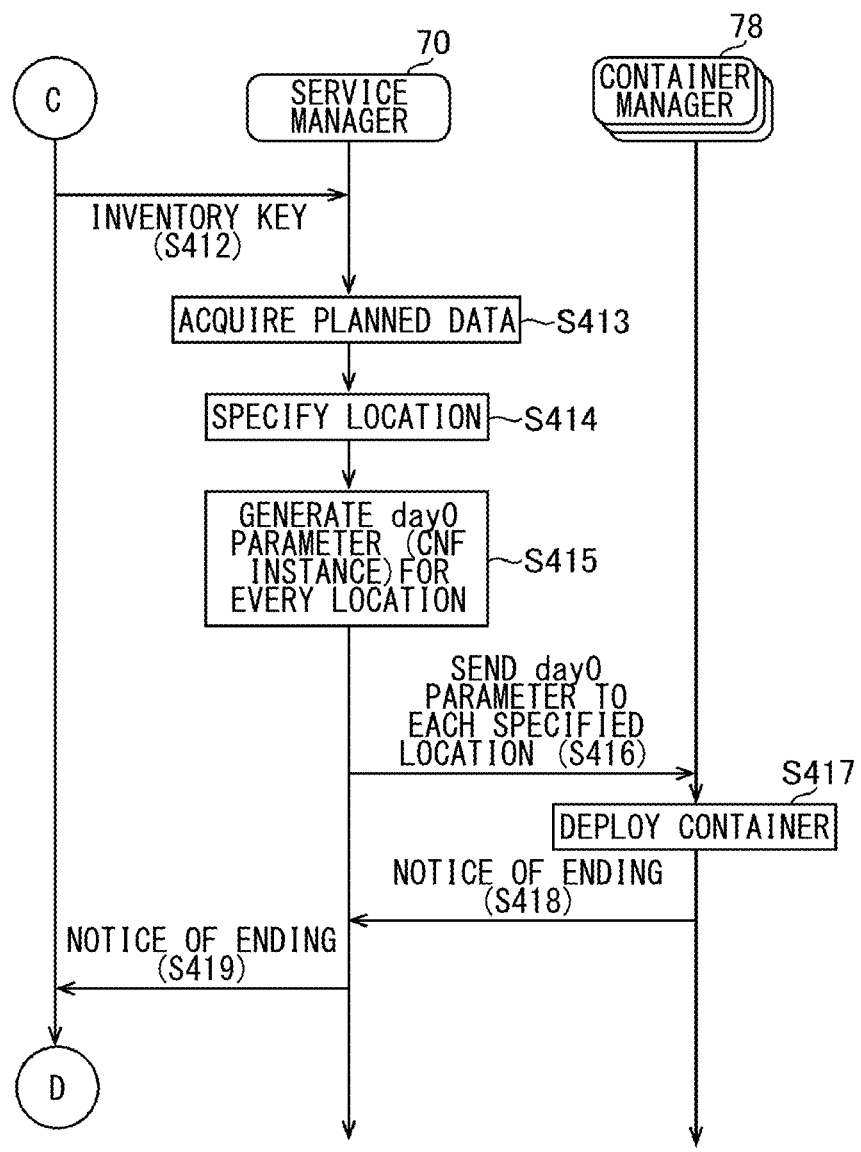
FIG. 22C is a flow diagram showing an example of a process executed by an NOS according to an embodiment of the present invention.
Figure 22D:
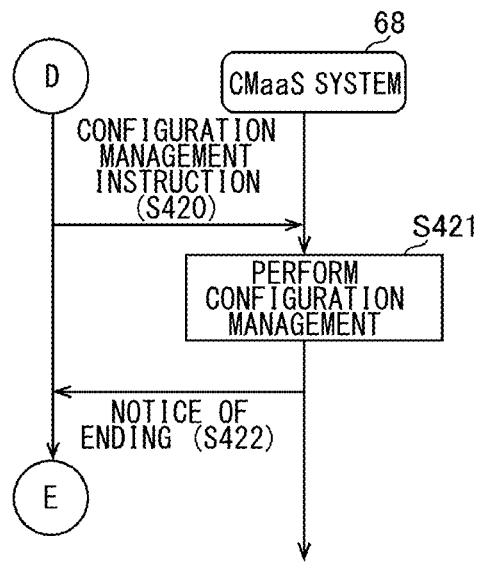
FIG. 22D is a flow diagram showing an example of a process executed by an NOS according to an embodiment of the present invention.
Figure 22E:
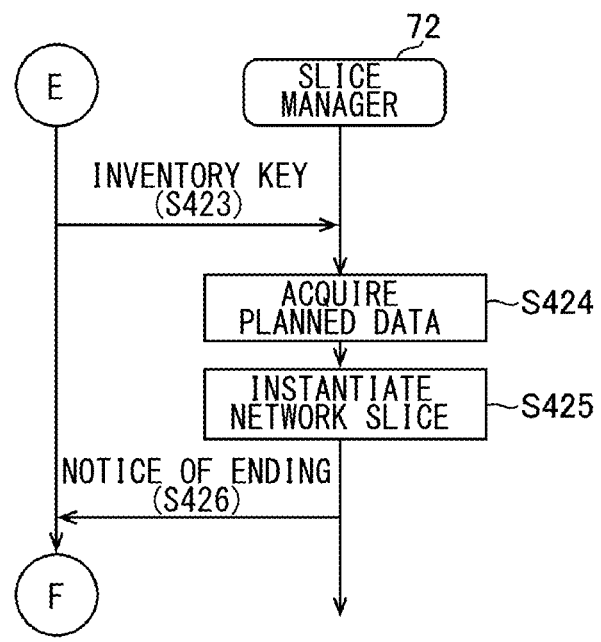
FIG. 22E is a flow diagram showing an example of a process executed by an NOS according to an embodiment of the present invention.
Figure 22F:
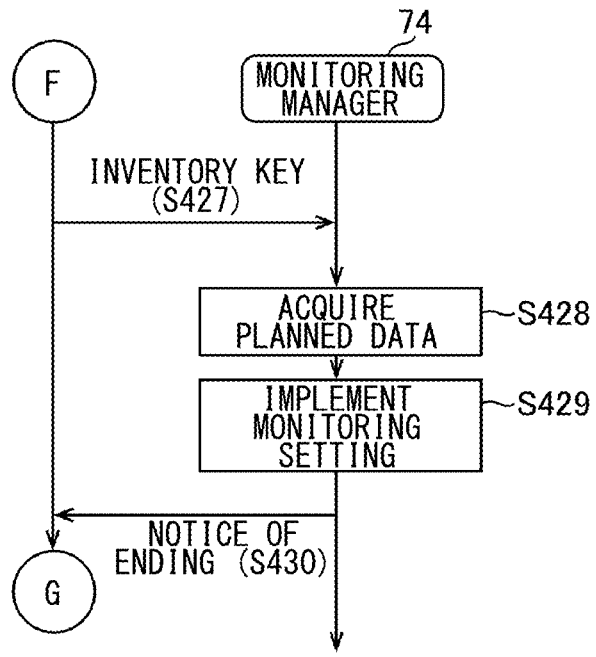
FIG. 22F is a flow diagram showing an example of a process executed by an NOS according to an embodiment of the present invention.
Figure 22G:
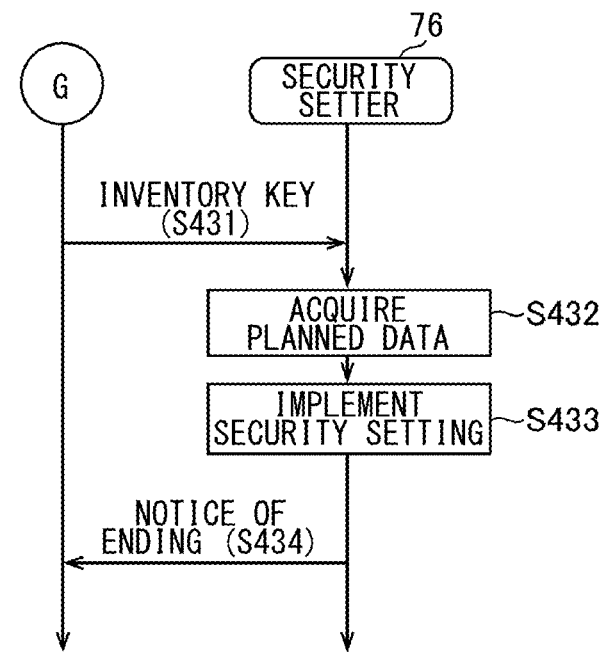
FIG. 22G is a flow diagram showing an example of a process executed by an NOS according to an embodiment of the present invention.

With reference to a flow diagram shown in FIG. 21, a process executed by the purchaser terminal 14, the MPS 10, and the NOS 12 when the purchaser clicks the Purchase button 34 on the purchase confirmation screen shown in FIG. 4 or 5 will be described below.

First, the purchaser terminal 14 sends a purchase request for the network service to the purchase manager 54 of the MPS 10 (S301). The purchase bundle ID and the purchase service requirement data sent in the step indicated with S201 are related to the purchase request.

Receiving the purchase request related to the purchase bundle ID and the purchase service requirement data in the step indicated with S301, the purchase manager 54 sends the received purchase request to the E2EO 62 (S302).

Receiving the purchase request, the E2EO 62 specifies service catalog data related to the purchase bundle ID, which is related to the received purchase request (S303).

The E2EO 62 acquires the service catalog data specified in the step indicated with S303 from the service catalog storage 64 and runs a workflow script shown by the service catalog data (S304). This ends the process shown in this process example.

With reference to flow diagrams shown in FIGS. 22A to 22G, a process shown in step S304 will be described in detail.

First, the E2EO 62 and the inventory manager 66 generate planned data based on the service requirement data related to the purchase request, the service catalog data, the inventory template data, and the inventory data (S401). A process executed in step S401, for example, includes a process for specifying a resource pool to which a functional unit group is deployed, as well as a necessary resource.

The inventory manager 66 stores the generated planned data on the inventory database 82 (S402).

The inventory manager 66 outputs an inventory key included in the generated planned data to the E2EO 62 (S403).

Then, accepting the inventory key, the E2EO 62 outputs the accepted inventory key to the CMaaS system 68 (S404).

Then, accepting the inventory key, the CMaaS system 68 acquires the planned data including the accepted inventory key from the inventory database 82 (S405).

The CMaaS system 68, based on the planned data acquired in the step indicated with S405, generates planned CM data including a day1 parameter and keeps the generated data (S406).

The CMaaS system 68 outputs an instruction about a setup including reserving a necessary hardware resource to the BMaaS system 84 (S407), and the BMaaS system 84 performs the setup including reserving a necessary hardware resource in accordance with the instruction (S408). At this stage, system software compatible with a functional unit of a specific type may be set up, and a free server may be added to the resource pool, as needed.

In the present embodiment, a free server may be added to the resource pool with a margin (a buffer) provided. For example, a plurality of the servers 90 may be added to the resource pool in one go.

When the BMaaS system 84 outputs a notice of ending to the CMaaS system 68 (S409), the CMaaS system 68 updates the resource pool management data (S410). In this example, the value in the remaining core count data of the resource pool from which the reserved hardware resource is taken may be subtracted. The count of free servers or the value in the total core number data may be updated. In the step indicated with S410, the BMaaS system 84 rather than the CMaaS system 68 may update the resource pool management data. Following an instruction from the CMaaS system 68, the inventory manager 66 may update the resource pool management data.

The CMaaS system 68 outputs a notice of ending to the E2EO 62 (S411).

Then, the E2EO 62 outputs the inventory key, which was accepted in the step indicated with S403, to the service manager 70 (S412).

Then, accepting the inventory key, the service manager 70 acquires the planned data including the accepted inventory key from the inventory database 82 (S413).

The service manager 70, based on the planned data acquired in the step indicated with S418, specifies a location to which the functional unit group is deployed (S414).

The service manager 70 generates a day0 parameter (a CNF instance) for every location specified in the step indicated with S414 (S415).

The service manager 70 outputs the day0 parameter related to the container manager 78 to the corresponding container manager 78 associated with the corresponding location each specified in the step indicated with S414 (S416).

Accepting the day0 parameter, the container manager 78 deploys a container based on the accepted day0 parameter (S417).

The container manager 78 outputs a notice of ending to the service manager 70 (S418).

Then, the service manager 70 outputs a notice of ending to the E2EO 62 (S419).

The E2EO 62 outputs a configuration management instruction based on a day1 parameter to the CMaaS system 68 (S420).

Then, the CMaaS system 68 performs configuration management for a container group based on the day1 parameter included in the kept planned CM data (S421).

The CMaaS system 68 outputs a notice of ending to the E2EO 62 (S422).

Then, the E2EO 62 outputs the inventory key, which was accepted in the step indicated with S403, to the slice manager 72 (S423).

Then, accepting the inventory key, the slice manager 72 acquires the planned data including the accepted inventory key from the inventory database 82 (S424).

The slice manager 72, based on the planned data acquired in the step indicated with S429, instantiates a network slice (S425). In the step indicated with S425, the slice manager 72, as described above, may give the CMaaS system 68 an instruction for configuration management relating to instantiation of the network slice, for example. Then, the CMaaS system 68 may perform configuration management such as configuring settings in conformity with the configuration management instruction.

As described above, without execution of the steps indicated with S420 to S422, in the step indicated with S425, the CMaaS system 68 may update the day1 parameter, based on a configuration management instruction given by the slice manager 72. Then, the CMaaS system 68 may perform configuration management such as configuring settings in conformity with the configuration management instruction.

The slice manager 72 outputs a notice of ending to the E2EO 62 (S426).

Then, the E2EO 62 outputs the inventory key, which was accepted in the step indicated with S403, to the monitoring manager 74 (S427).

Then, accepting the inventory key, the monitoring manager 74 acquires the planned data including the accepted inventory key from the inventory database 82 (S428).

The monitoring manager 74, based on the planned data acquired in the step indicated with S428, implements a monitoring setting in conformity with the monitoring policy shown by the purchase service requirement data (S429).

The monitoring manager 74 outputs a notice of ending to the E2EO 62 (S430).

Then, the E2EO 62 outputs the inventory key, which was accepted in the step indicated with S403, to the security setter 76 (S431).

Then, accepting the inventory key, the security setter 76 acquires the planned data including the accepted inventory key from the inventory database 82 (S432).

The security setter 76, based on the planned data acquired in the step indicated with S432, implements a security setting (S433).

The security setter 76 outputs a notice of ending to the E2EO 62 (S434). This ends the process shown in this process example.

The present invention should not be limited to the embodiment described above.

The network service provided to the purchaser may be implemented by, for example, a virtualized network function (VNF) that is a virtual machine (VM)-based functional unit using hypervisor- or host-based virtualization technology, rather than the container-based functional unit CNF. When a functional unit of a specific type is deployed to an unassigned hardware resource (in this example, a free server), system software compatible with the functional unit of the specific type may be set up on a host OS that is a virtual machine environment platform.

The division of roles for the functions, which is shown in FIG. 8, is not limited to the one shown in FIG. 8, for example. Part of the process executed by the E2EO 62 may be executed by, for example, the inventory manager 66. Part of the process executed by the inventory manager 66 may be executed by, for example, the E2EO 62.

In the present embodiment, the NOS 12 may not include the repository 80. The bundle expander 60 may cause the container manager 78 to store the Helm chart data and the container image data. The container manager 78 may deploy the container image stored on the container manager 78.

In the present embodiment, the NOS 12 may not include the bundle expander 60. A bundled file may be on-boarded from, for example, an external file transfer server.

Example

An example of the present disclosure will be described based on the prerequisite technique described above. The following description is primarily given on differences between the example and the prerequisite technique, and details that are already described in Prerequisite Technique are omitted as appropriate. In the following description, components identical or equivalent to the components of the prerequisite technique are assigned with the same reference numerals.

Challenges that a network service management system of an example is designed to solve are described.

Challenge 1: as described in Prerequisite Technique, a vendor such as a service provider who provides a network service uploads a verified bundled file into a network operating system (NOS). The bundled file defines various items of information about the network service to be provided. The NOS builds the network service shown by the bundled file. Before providing the network service to a purchaser, it is necessary to conduct tests on the network service in a plurality of environments such as a test environment and a production environment and check that the network service properly operates. Up to now, a piece of test data that specifies test content for the network service needs to be prepared for each of different environments in which tests are conducted. This takes much time and effort.

Challenge 2: as described in Prerequisite Technique, a service in which a company possessing a network platform (e.g., a telecommunications company) allows other companies to use the company's network platform so that the other companies can run their network service on the company's network platform (hereinafter also referred to as a "platform service") is expected to come into wide use in the future. To promote the use of such a platform service, it is important to help a user of the platform service (the other companies described above, such as a network service provider) to build a network service with less time and effort.

A network service management system of an example, designed to solve the challenge 1 described above, includes an accepter, a first generator, a first tester, a second generator, and a second tester. The accepter corresponds to a CI/CD assist device 106 (a bundle accepter 116) described later. The accepter accepts a test template equivalent to data that specifies test content for a network service from a vendor. A part of fields of the test content is set to a variable field in which a value is variable. The first generator corresponds to an NOS 102a or an NOS 102b (the E2EOs 62) described later. The first generator generates test data that specifies test content compatible with a first environment (e.g., a test environment) by setting a value compatible with the first environment in the variable field of the test template.

The first tester corresponds to a test device 104a or a test device 104b described later. The first tester conducts a test on the network service in the first environment by using the test data generated by the first generator. The second generator corresponds to an NOS 102c (the E2EOs 62) described later. The second generator generates test data that specifies test content compatible with a second environment (e.g., a production environment) by setting a value compatible with the second environment in the variable field of the test template. The second tester corresponds to a test device 104c described later. The second tester conducts a test on the network service in the second environment by using the test data generated by the second generator.

The first environment may be a test environment while the second environment may be a production environment. The first tester may conduct a test on the network service in the test environment in an event that the test template is accepted. The second tester may conduct a test on the network service in the production environment in an event that the network service is purchased by a purchaser.

The network service management system may further include a manager to manage testing both in the first environment and in the second environment. The manager corresponds to the CI/CD assist device 106 described later. The first environment may be a test environment while the second environment may be a production environment. The manager may give the test template to the first generator to enable testing of the network service in the test environment. When a test on the network service in the test environment is passed, the manager may give the test template to the second generator to enable testing of the network service in the production environment.

The test template may include a specific field in which data about either of the first generator and the second generator is to be set. The specific field corresponds to an environment field described later. The manager may set data about the first generator (e.g., data about the test environment) in the specific field of the test template given to the first generator, and may set data about the second generator (e.g., data about the production environment) in the specific field of the test template given to the second generator.

A network service management system of an example, designed to solve the challenge 2 described above, includes an accepter, a builder, and a tester. The accepter corresponds to a CI/CD assist device 106 (a bundle accepter 116) described later. The accepter accepts configuration data and test data collectively from a vendor that provides a network service to a customer by using a platform service. The configuration data specifies a functional unit required to provide the network service, and the test data specifies test content for either of the network service and the functional unit.

The builder corresponds to a platform as a service (PaaS) in each of the NOS 102a, the NOS 102b, and the NOS 102c described later. Specifically, the PaaS includes the inventory manager 66, the CMaaS system 68, the service manager 70, the slice manager 72, the monitoring manager 74, the security setter 76, and the container managers 78 in each of the systems. The builder automatically builds the functional unit specified by the configuration data that is accepted by the accepter. The tester corresponds to any of the test device 104a, the test device 104b, and the test device 104c described later. The tester automatically conducts a test on either of the network service and the functional unit based on the test data. The network service and the functional unit are built by the builder.

The network management system may further include a first generator and a second generator. The first generator corresponds to an NOS 102a or an NOS 102b (the E2EOs 62) described later. The second generator corresponds to an NOS 102c (the E2EOs 62) described later. The test data accepted by the accepter may be a test template in which a part of fields is set to a variable field where a value is variable. The builder may include a first builder to build the functional unit specified by the configuration data in the test environment and a second builder to build the functional unit specified by the configuration data in the production environment. The first builder corresponds to the PaaS in either of the NOS 102a and the NOS 102b described later. The second builder corresponds to the PaaS in the NOS 102c described later.

The first generator may generate test data for the test environment by setting data about either of the network service and the functional unit in the variable field of the test template, in which the network service and the functional unit are built in the test environment. The second generator may generate test data for the production environment by setting data about either of the network service and the functional unit in the variable field of the test template, in which the network service and the functional unit are built in the production environment. The tester may include: a first tester to conduct a test on either of the network service and the functional unit based on the test data for the test environment, the network service and the functional unit being built in the test environment; and a second tester to conduct a test on either of the network service and the functional unit based on the test data for the production environment, the network service and the functional unit being built in the production environment. The first tester corresponds to a test device 104a or a test device 104b described later. The second tester corresponds to a test device 104c described later.

The network management system may further include a manager to manage building of and testing of the network service both in the test environment and in the production environment. The manager corresponds to the CI/CD assist device 106 described later. The manager may give the configuration data and the test data to the test environment to enable building of and testing of the network service in the test environment. When a test on the network service built in the test environment is passed, the manager may give the configuration data and the test data to the production environment to enable building of and testing of the network service in the production environment.

At least one of the configuration data and the test data may include a specific field in which data about either of the test environment and the production environment is to be set. The specific field corresponds to an environment field described later. The manager may set data about the test environment in the specific field of at least one of the configuration data and the test data given to the test environment, and may set data about the production environment in the specific field of at least one of the configuration data and the test data given to the production environment.

Figure 23:
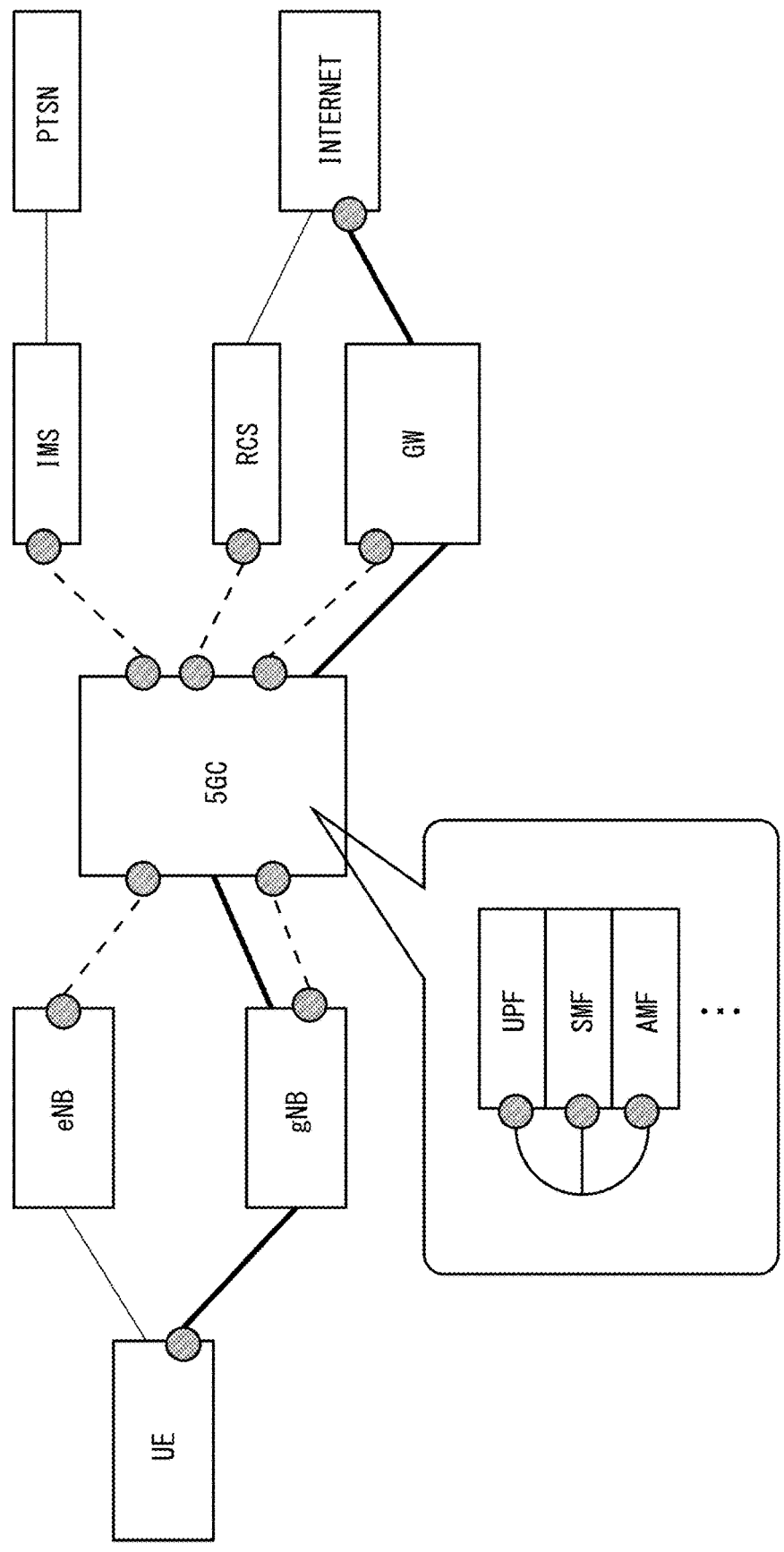
FIG. 23 is a drawing illustrating test types in an example.

FIG. 23 is a drawing illustrating test types in an example. A test conducted individually on a single network function such as UPF, SMF, and AMF is referred to as a "unit test". A test on a system, such as 5GC and gNB, that includes a plurality of network functions is referred to as a "system test". In FIG. 23, a test conducted to check coordination between UPF, SMF, and AMF for normality is equivalent to a system test. A test on systems directly coordinating with each other is referred to as a "connection test". In FIG. 23, connection tests are shown by dashed lines. For example, a test conducted between 5GC and eNB is equivalent to a connection test. A test conducted to check an end-to-end network service for normality is referred to as an "E2E test". In FIG. 23, a test conducted between UE and Internet shown with bold lines is equivalent to an E2E test. The E2E test in a production environment described later is also referred to as a "deployment test".

A configuration of a network service management system of an example will be described in detail.

Figure 24:
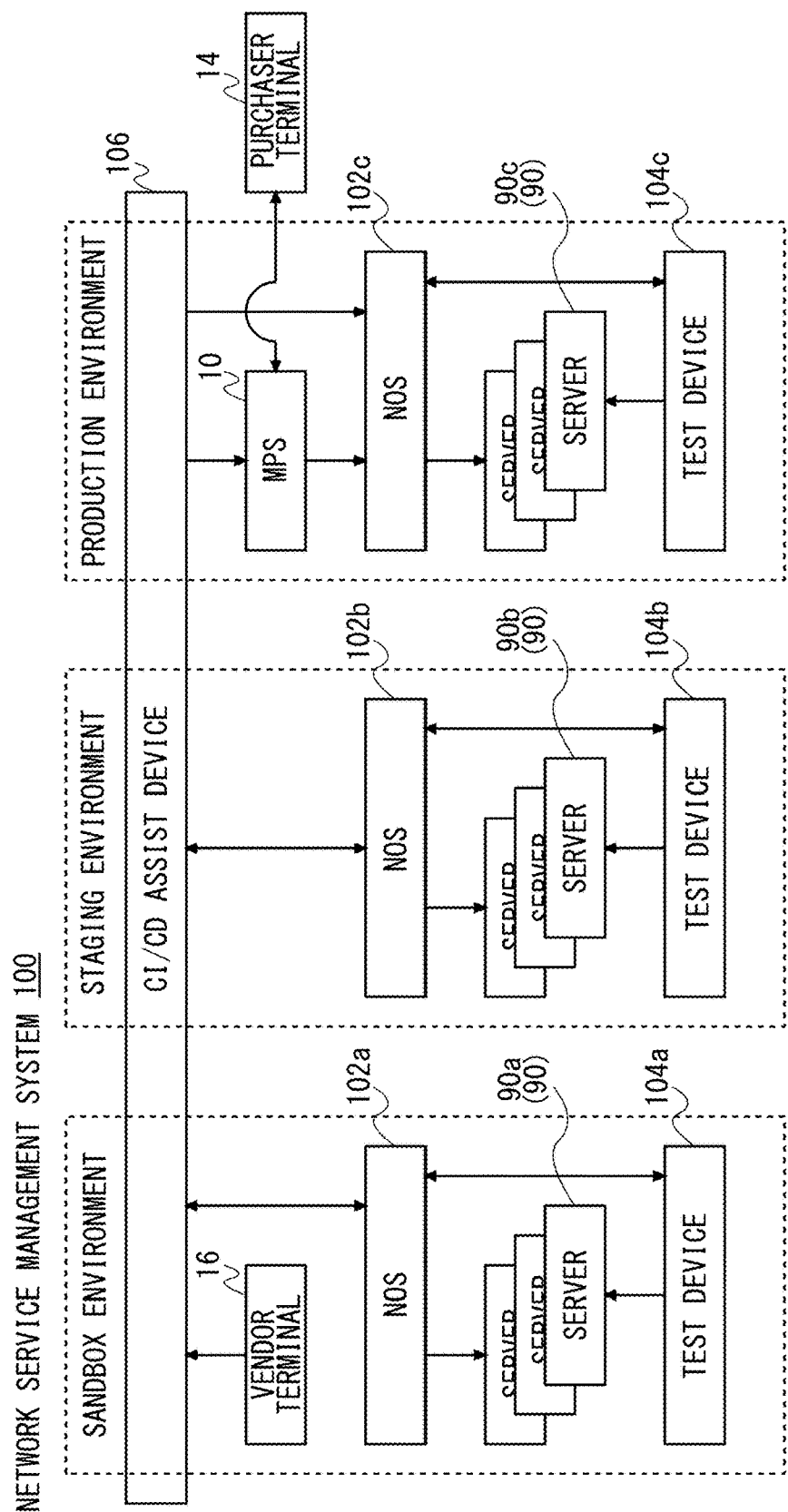
FIG. 24 is a drawing showing a configuration of a network service management system of an example.

FIG. 24 shows a configuration of a network service management system 100 of an example. The network service management system 100 includes a network operating system (NOS) 102a, a test device 104a, and a server 90a that are disposed in a sandbox environment. The network service management system 100 also includes an NOS 102b, a test device 104b, and a server 90b that are disposed in a staging environment. The network service management system 100 also includes a marketplace system (MPS) 10, an NOS 102c, a test device 104c, and a server 90c that are disposed in a production environment. These devices are connected to each other via a communications network including a LAN and a WAN.

The production environment is an environment where an application for a network service provided to a user actually runs. The production environment can also be called an actual environment or a commercial environment. The staging environment is a test environment where a resource available to the server 90b is similar (or equal) to that in the production environment. The sandbox environment is a development environment where a resource available to the server 90a is greatly limited and can also be called a minimum test environment. The sandbox environment, the staging environment, and the production environment each include a physical information processing device and a communications network.

Each of the NOS 102a, the NOS 102b, and the NOS 102c corresponds to the NOS 12 described in Prerequisite Technique. Each of the NOS 102a, the NOS 102b, and the NOS 102c includes a functional block similar to that of the NOS 12 described in Prerequisite Technique (for example, a plurality of functional blocks described in FIG. 8).

Each of the server 90a, the server 90b, and the server 90c corresponds to the server 90 described in Prerequisite Technique and includes one or more information processing devices. The server 90a, the server 90b, and the server 90c are implemented with a plurality of network functions (e.g., UPF, SMF, and AMF) that constitute a network service. In the example, the network functions are each virtualized (in other words, turned into software). A plurality of CNFs designed to implement a plurality of network functions are disposed on the server 90a, the server 90b, and the server 90c. Hereinbelow, the server 90a, the server 90b, and the server 90c are sometimes collectively referred to as the server 90.

The test device 104a is an information processing device used to conduct a test on a network service (a functional unit group) built in the sandbox environment, based on test data providing test content for the network service. The test device 104b is an information processing device used to conduct a test on a network service (a functional unit group) built in the staging environment, based on test data. The test device 104c is an information processing device used to conduct a test on a network service (a functional unit group) built in the production environment, based on the test data.

The network service management system 100 further includes a continuous integration/continuous delivery (CI/CD) assist device 106 disposed across the sandbox environment, the staging environment, and the production environment. The CI/CD assist device 106 is an information processing device corresponding to the CI/CD pipeline described in Prerequisite Technique. The CI/CD assist device 106 communicates with the devices each disposed in the sandbox environment, the staging environment, and the production environment to manage building of and testing of the network service in each of the sandbox environment, the staging environment, and the production environment.

Figure 25:
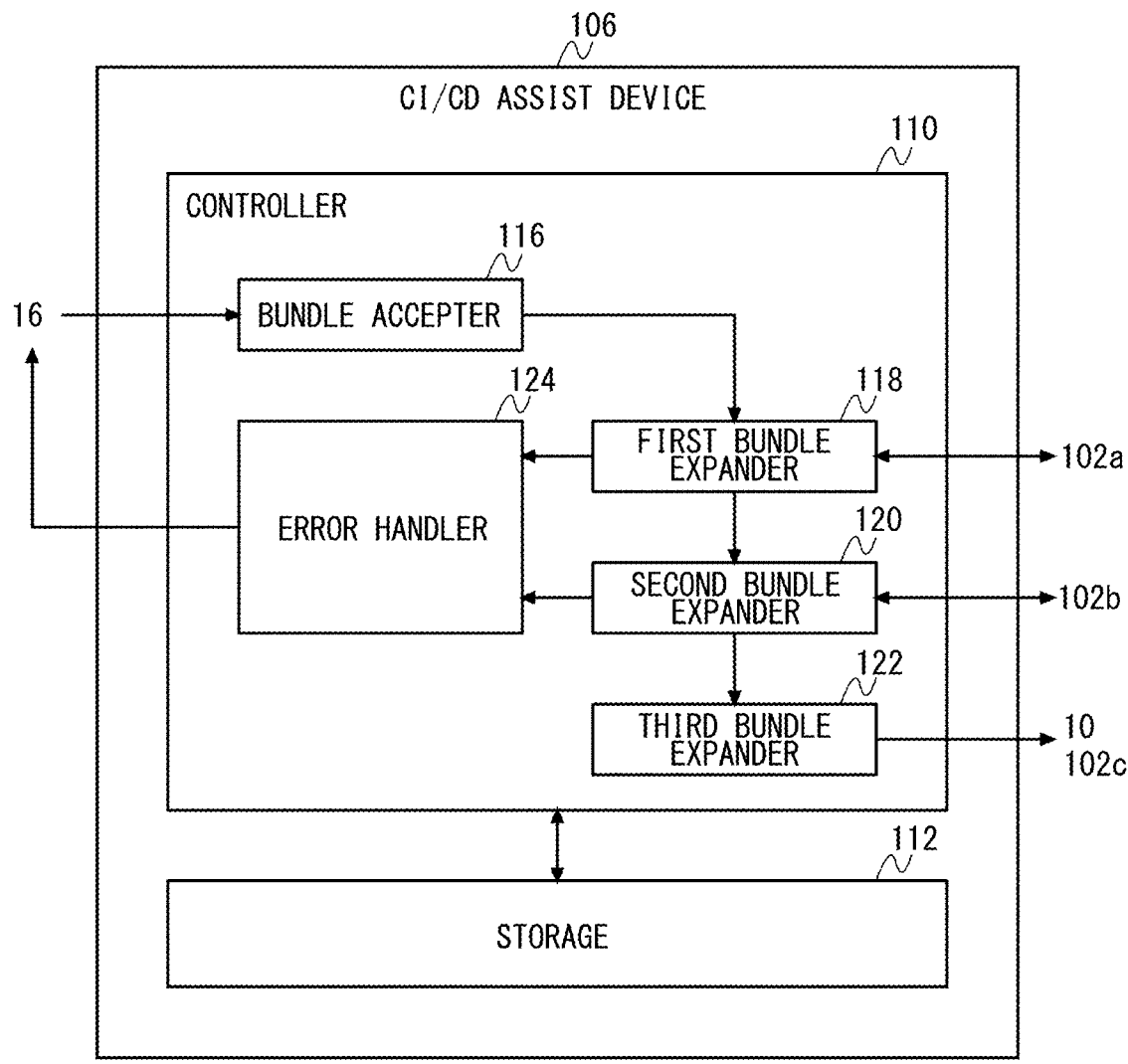
FIG. 25 is a block diagram showing functional blocks of a CI/CD assist device in FIG. 24.

FIG. 25 is a block diagram showing functional blocks of the CI/CD assist device 106 in FIG. 24. The blocks shown in the block diagrams of this specification of this specification are implemented by any of devices, electronic circuits, and mechanisms such as computer processors, CPUs, and memory in terms of hardware and by any of computer programs and applications in terms of software. The drawings shown herein illustrate functional blocks implemented through coordination of these components. Thus, it will be understood by those skilled in the art that these functional blocks can be implemented in various forms by combinations of the hardware and software.

The CI/CD assist device 106 includes a controller 110 and a storage 112. The controller 110 executes a variety of data processing done by a CI/CD pipeline. The storage 112 stores data referred to or updated by the controller 110.

The storage 112 stores a bundled file uploaded from a vendor terminal 16. The storage 112 stores data about the respective devices disposed in the sandbox environment, the staging environment, and the production environment. The storage 112 may store, for example, an IP address and a host name of an E2EO 62 or an IP address and a host name of a CMaaS system 68 in each of the NOS 102a, the NOS 102b, and the NOS 102c. The storage 112 may store respective IP addresses and host names of the test device 104a, the test device 104b, and the test device 104c.

The controller 110 includes a bundle accepter 116, a first bundle expander 118, a second bundle expander 120, a third bundle expander 122, and an error handler 124. These functions may be implemented as application programs that use functions of Jenkins, which is well-known CI/CD pipeline software. A processor (e.g., a CPU) in the CI/CD assist device 106 may read Jenkins' program and the application programs stored on the storage 112 into main memory and run these programs to fulfill functions of the functional blocks.

The bundle accepter 116 accepts a bundled file uploaded from the vendor terminal 16. In the example, the bundled file is prepared by a vendor who provides a user (i.e., a purchaser) with a network service of the vendor using a platform service provided by the network service management system 100. In the example, the bundled file includes a configuration file template and a test script template.

The configuration file template is a file that includes data required to deploy a network service and manage the network service. In the example, the configuration file template includes product catalog data, service catalog data, inventory template data, CM template data, service template data, slice template data, monitoring script data, security script data, Helm chart data, and container image data shown in FIG. 9 for the prerequisite technique.

The bundled file may include business section data, technology section data, security section data, and operation section data described in Prerequisite Technique (FIG. 6) instead of the configuration file template. In this case, the bundle accepter 116 may prepare, based on these pieces of the data, product catalog data, service catalog data, inventory template data, CM template data, service template data, slice template data, monitoring script data, security script data, Helm chart data, and container image data.

The test script template is equivalent to data that specifies test content for a network service built based on the configuration file template. The test script template, for example, includes respective contents of a unit test, a system test, a connection test, an E2E test, and a deployment test. The test script template may, for example, include a command (a ping command, a curl command, etc.) used to check communication between a plurality of network functions and CNFs that constitute test objects and a parameter, an attribute, or an argument needed to run the command.

In the example, the unit test and the system test are conducted in the sandbox environment, the connection test and the E2E test are conducted in the staging environment, and the deployment test is conducted in the production environment. At least a part of the test contents conducted in the sandbox environment, the staging environment, and the production environment may be shared. In the staging environment and the production environment, a full set of a unit test, a system test, a connection test, and an E2E test (or a deployment test with the same content as the E2E test has) may be conducted.

In the test script template, a part of fields of the test content is set to a variable field in which a value is variable. The variable field may represent a parameter, an attribute, or an argument needed to run a command (a ping command, a curl command, etc.) used to test the network service (the functional unit group). The test script template may include an IP address or a host name for the plurality of the network functions and the CNFs, which constitute test objects, as a variable field. The value in the variable field is not set by the vendor but is set dynamically by the network service management system 100.

The test script template may include input data entered for the network service or a network function (e.g., the plurality of the CNFs disposed on the server 90) and data (hereinafter also referred to as "correct data") that ought to be output from the network service or the network function (e.g., the plurality of the CNFs disposed on the server 90) in response to the input data. Each of the test device 104a, the test device 104b, and the test device 104c may enter the input data specified by the test script template (test data described later) into the CNF disposed on the server 90 in each of the environments and may determine whether the test is passed or failed based on whether or not data output from the CNF matches the correct data.

The configuration file template and the test script template each include a field (hereinafter also referred to as an "environment field") in which data is to be set concerning a subject for building of and a subject for testing of the network functions in each of the sandbox environment, the staging environment, and the production environment.

The environment fields include IP addresses and host names of the E2EOs 62 in the respective environments. The environment fields include IP addresses and host names of builders in the respective environments. Each of the builders is a subject that builds the network service and includes, as described above, the inventory manager 66, the CMaaS system 68, the service manager 70, the slice manager 72, the monitoring manager 74, the security setter 76, and the container managers 78. The environment fields include IP addresses and host names of the test devices in the respective environments. In the example, in a similar way to the variable field, each of the environment fields of the configuration file template and the test script template is a field in which a value is variable and the value is set dynamically.

The first bundle expander 118, the second bundle expander 120, and the third bundle expander 122 each correspond to the bundle expander 60 in Prerequisite Technique. The first bundle expander 118 sends a bundled file to the NOS 102a in the sandbox environment. The second bundle expander 120 sends a bundled file to the NOS 102b in the staging environment. The third bundle expander 122 sends a bundled file to the MPS 10 and the NOS 102c in the production environment.

When a result of a test in the sandbox environment or in the staging environment is below a qualifying standard, the error handler 124 executes predetermined error handling.

Figure 26:
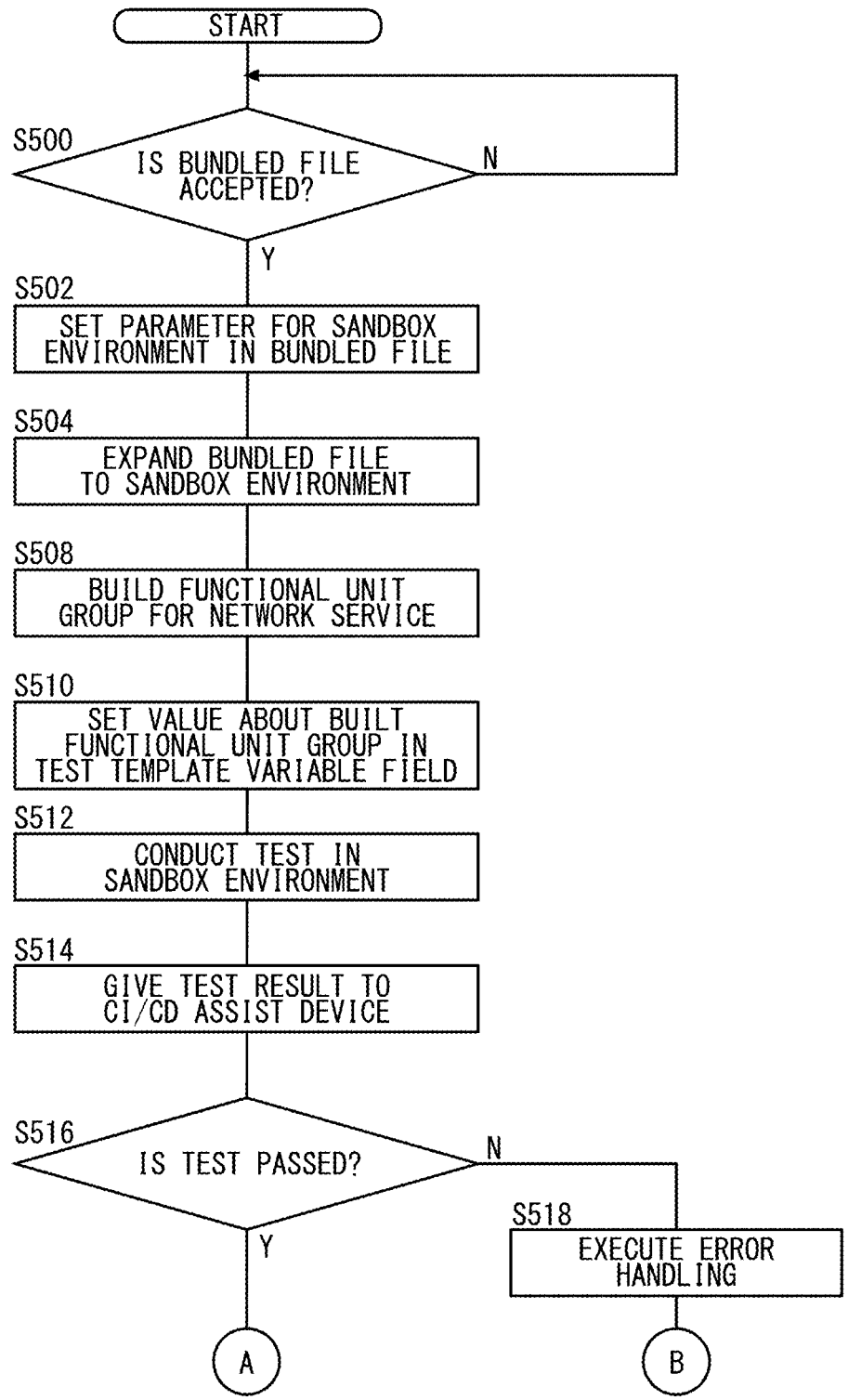
FIG. 26 is a flowchart showing an operation run on a network service management system of an example.

An operation run on the network service management system 100 configured as described above will be described. FIG. 26 is a flowchart showing an operation run on the network service management system 100 of the example. The vendor terminal 16, in response to an operation by a person in charge at the vendor, sends a bundled file prepared by the vendor to the CI/CD assist device 106. The bundle accepter 116 of the CI/CD assist device 106 is on standby until it receives the bundled file sent from the vendor terminal 16 (N in step S500). When receiving the bundled file sent from the vendor terminal 16 (Y in step S500), the bundle accepter 116 stores the bundled file on the storage 112.

The first bundle expander 118 of the CI/CD assist device 106 sets a parameter value for the sandbox environment that is stored on the storage 112 in advance in the environment fields of the configuration file template and the test script template included in the bundled file (S502). The first bundle expander 118 expands the configuration file template and the test script template to the sandbox environment, with the parameter value for the sandbox environment being set in the environment fields. (S504).

Specifically, the first bundle expander 118, in a similar way to the bundle expander 60 in Prerequisite Technique, sends a plurality of types of the configuration file template included in the bundled file to the E2EO 62 and the builder in the NOS 102*a*. The first bundle expander 118 also sends the test script template included in the bundled file to the E2EO 62 in the NOS 102*a*. The first bundle expander 118 instructs the E2EO 62 of the NOS 102*a* to start workflow for building the network service. As described in Prerequisite Technique, the E2EO 62 and the builder in the NOS 102*a*, by coordinating with each other, automatically build functional units (e.g., CNFs) specified by the configuration file template to automatically build the network service specified by the configuration file template (S508).

Settings (e.g., monitoring frequency) concerning a monitoring process by the monitoring manager 74 and the number of CNFs (e.g., the number of CNF instances that ought to be run) are basically determined based on service requirements and other information entered by the purchaser. For example, the number of CNF constituents may be determined according to the number of accommodated persons selected by the purchaser on the network service purchase screen. The purchaser may select once per one second or once per five seconds as monitoring frequency on the network service purchase screen. However, since no information is entered by the purchaser at tests in the sandbox environment and the staging environment, the E2EO 62 in each environment may determine settings (parameters) that suit the environment.

The E2EO 62 and the builder in the NOS 102*a* in the sandbox environment may build CNFs by applying a parameter value for a minimum configuration to the configuration file template, for example. The E2EO 62 and the builder in the NOS 102*b* in the staging environment may build CNFs by applying a parameter value for a maximum configuration to the configuration file template. Meanwhile, in the production environment, various parameters are determined based on service requirements and other information selected or entered by the purchaser. As described in Prerequisite Technique, the bundled file may specify, for example, sets of options for the number of accommodated persons at the MPS 10 and the number of CNF constituents associated with the respective options. Then, the number of CNF constituents may be determined according to the option selected by the purchaser at the MPS 10.

The builder in the NOS 102*a* makes a functional unit group specified by the configuration file template by following the procedure described in Prerequisite Technique. Specifically, the inventory manager 66 generates planned data. The service manager 70 generates day0 data (a day0 parameter), and the container manager 78, in accordance with the day0 data, deploys a CNF group corresponding to the functional unit group to the servers 90. The number of CNF constituents described above may be reflected in the planned data.

The CMaaS system 68 generates day1 data (a day1 parameter) and inputs settings based on the day1 data into the CNF group deployed to the servers 90. The slice manager 72 and the CMaaS system 68 configure a network slice and a network slice subnet based on the CNF group deployed to the servers 90. The monitoring manager 74 implements a monitoring setting. The similar procedure is followed when the builder in the NOS 102*b* builds a functional unit group as well as when the builder in the NOS 102*c* builds a functional unit group.

In response to a request from the E2EO 62, the builder in the NOS 102*a* sends information about a CNF instance generated in the sandbox environment to the E2EO 62. Information about the CNF instance may include information that enables identification of the CNF instance in the sandbox environment, such as an IP address and a host name of the CNF instance. Information about the CNF instance may include a type of the CNF instance and the number of the CNF instances. The builder may send information about the CNF instance generated in the sandbox environment to the E2EO 62 without waiting a request from the E2EO 62.

Accepting the test script template from the CI/CD assist device 106, the E2EO 62 of the NOS 102*a* sets information about the CNF instance, which is acquired from the builder, in the variable field of the accepted test script template and thereby prepares test data for the sandbox environment, with a value being put in the variable field of the test script template (S510). The E2EO 62 sends the test data for the sandbox environment to the test device 104*a*.

When accepting the test data from the NOS 102*a*, the test device 104*a* conducts a test for the sandbox environment, which is specified by the test data, on the CNF group (the functional unit group constituting the network service) built in the sandbox environment in step S508 (S512). The test, for example, includes a unit test and a system test described with reference to FIG. 23. The test device 104*a* informs the CI/CD assist device 106 about a result of the test in the sandbox environment as well as that the test in the sandbox environment has ended (S514).

The CI/CD assist device 106 stores a pass/fail standard (e.g., a threshold for determining whether or not the test is passed) in advance that is defined for test results in the sandbox environment. The pass/fail standard may be set by the vendor or may be included in the bundled file. When the result of the test in the sandbox environment, which is informed by the test device 104*a*, is a fail by the pass/fail standard (N in step S516), the CI/CD assist device 106 executes predetermined error handling (S518) and ends the process based on the bundled file. In the error handling, the CI/CD assist device 106 may send the vendor terminal 16 the result of the test in the sandbox environment together with information indicating a test failure in the sandbox environment. When the result of the test in the sandbox environment, which is informed by the test device 104*a*, is a pass by the pass/fail standard (Y in step S516), the CI/CD assist device 106 goes to a test in the staging environment (A in the drawing).

Figure 27:
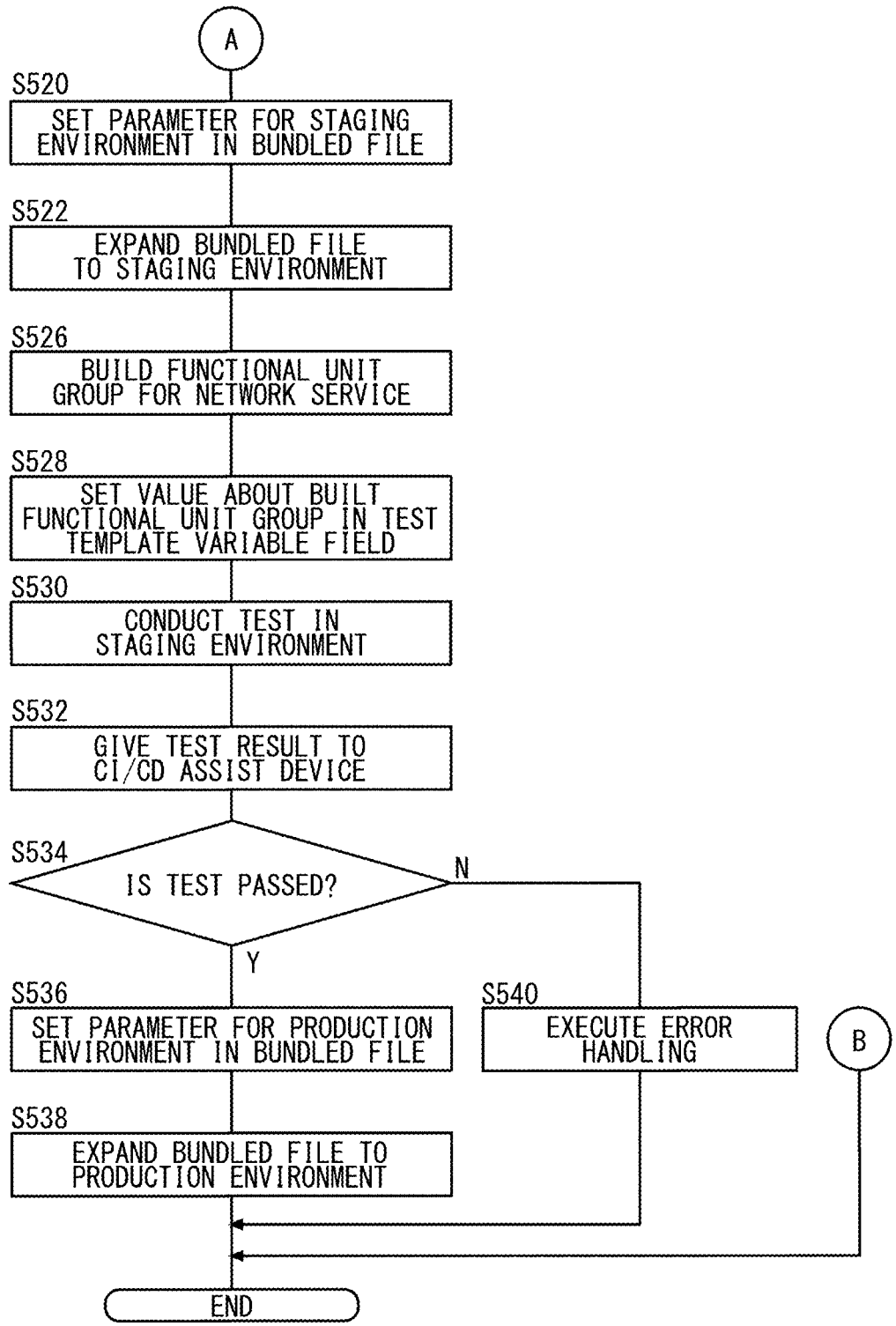
FIG. 27 is a flowchart following FIG. 26, showing an operation run on the network service management system.

FIG. 27 is a flowchart following FIG. 26, showing an operation run on the network service management system 100. The flowchart shows an operation that is run when the result of the test in the sandbox environment, which is informed by the test device 104*a*, is a pass by the pass/fail standard. The second bundle expander 120 of the CI/CD assist device 106 sets a parameter value for the staging environment that is stored on the storage 112 in advance in the environment fields of the configuration file template and the test script template included in the bundled file, which is accepted in step S500 (S520). The second bundle expander 120 expands the configuration file template and the test script template to the staging environment, with the parameter value for the staging environment being set in the environment fields. (S522).

Specifically, the second bundle expander 120, in a similar way to the bundle expander 60 in Prerequisite Technique, sends a plurality of types of the configuration file template included in the bundled file to the E2EO 62 and the builder in the NOS 102b. The second bundle expander 120 also sends the test script template included in the bundled file to the E2EO 62 in the NOS 102b. The second bundle expander 120 instructs the E2EO 62 of the NOS 102b to start workflow for building the network service. As described in Prerequisite Technique, the E2EO 62 and the builder in the NOS 102b, by coordinating with each other, automatically build functional units (e.g., CNFs) specified by the configuration file template to automatically build the network service specified by the configuration file template (S526).

In response to a request from the E2EO 62, the builder in the NOS 102b sends information about a CNF instance generated in the staging environment to the E2EO 62. Accepting the test script template from the CI/CD assist device 106, the E2EO 62 of the NOS 102b sets information about the CNF instance, which is sent from the builder, in the variable field of the accepted test script template and thereby prepares test data for the staging environment, with a value being put in the variable field of the test script template (S528). The E2EO 62 sends the test data for the staging environment to the test device 104b.

When accepting the test data from the NOS 102b, the test device 104b conducts a test for the staging environment, which is specified by the test data, on the CNF group (the functional unit group constituting the network service) built in the staging environment in step S526 (S530). The test, for example, includes a connection test and an E2E test described with reference to FIG. 23. The test device 104b informs the CI/CD assist device 106 about a result of the test in the staging environment as well as that the test in the staging environment has ended (S532).

The CI/CD assist device 106 stores a pass/fail standard in advance that is defined for test results in the staging environment. When the result of the test in the staging environment, which is informed by the test device 104b, is a fail by the pass/fail standard (N in step S534), the CI/CD assist device 106 executes predetermined error handling (S540) and ends the process based on the bundled file. In the error handling, the CI/CD assist device 106 may send the vendor terminal 16 the result of the test in the staging environment together with information indicating a test failure in the staging environment.

When the result of the test in the staging environment, which is informed by the test device 104b, is a pass by the pass/fail standard (Y in step S534), the third bundle expander 122 of the CI/CD assist device 106 sets a parameter value for the production environment that is stored on the storage 112 in advance in the environment fields of the configuration file template and the test script template included in the bundled file, which is accepted in step S500 (S536). The third bundle expander 122 expands the configuration file template and the test script template to the production environment, with the parameter value for the production environment being set in the environment fields. (S538).

Specifically, the third bundle expander 122, in a similar way to the bundle expander 60 in Prerequisite Technique, sends a plurality of types of the configuration file template included in the bundled file to the E2EO 62 and the builder in the NOS 102c. The third bundle expander 122 also sends the test script template included in the bundled file to the E2EO 62 in the NOS 102c.

Figure 28:
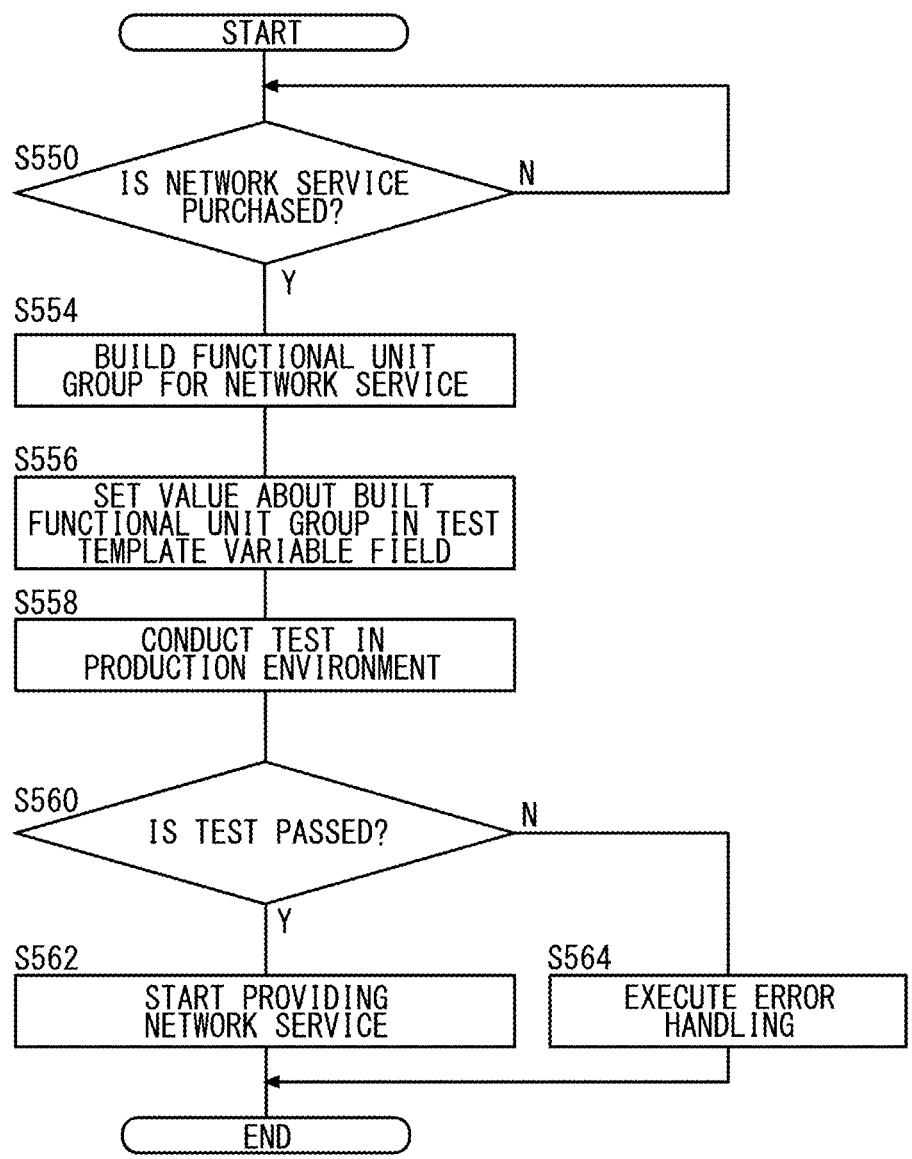
FIG. 28 is a flowchart showing an operation run on a network service management system of an example.

FIG. 28 is a flowchart showing an operation run on the network service management system 100. The NOS 102c is on standby until a purchaser purchases a network service at the MPS 10 (N in step S550). When a purchaser purchases a network service on the purchase screen at a marketplace, the MPS 10 informs the NOS 102c about the purchase. When being informed about the purchase of the network service (Y in step S550), the E2EO 62 and the builder in the NOS 102c, as described in Prerequisite Technique, by coordinating with each other, automatically build functional units (e.g., CNFs) specified by the configuration file template based on service requirements set by the purchaser (e.g., parameter values such as the number of accommodated persons and SLA information) as well as the configuration file template to automatically build the network service specified by the configuration file template (S554).

In response to a request from the E2EO 62, the builder in the NOS 102c sends information about a CNF instance generated in the production environment to the E2EO 62. Accepting the test script template from the CI/CD assist device 106, the E2EO 62 of the NOS 102c sets information about the CNF instance, which is sent from the builder, in the variable field of the accepted test script template and thereby prepares test data for the production environment, with a value being put in the variable field of the test script template (S556). The E2EO 62 sends the test data for the production environment to the test device 104c.

When accepting the test data from the NOS 102c, the test device 104c conducts a test for the production environment, which is specified by the test data, on the CNF group (the functional unit group constituting the network service) built in the production environment in step S554 (S558). The test, for example, includes a deployment test described with reference to FIG. 23.

In the example, the test device 104c informs the NOS 102c about a result of the test in the production environment as well as that the test in the production environment has ended. The NOS 102c stores a pass/fail standard in advance that is defined for test results in the production environment. When the result of the test in the production environment, which is informed by the test device 104c, is a pass by the pass/fail standard (Y in step S560), the NOS 102c starts providing the purchaser with the network service built in the production environment (S562). The NOS 102c may inform the purchaser terminal 14 that the network service has been started.

Meanwhile, when the result of the test in the production environment, which is informed by the test device 104c, is a fail by the pass/fail standard (N in step S560), the NOS 102c executes predetermined error handling (S564). In the error handling, the NOS 102c may inform the purchaser terminal 14 that the network service cannot be provided. At the same time, in the error handling, the NOS 102c may send the vendor terminal 16 the result of the test in the production environment together with information indicating a test failure in the production environment. In a modification example, the CI/CD assist device 106 may determine a pass or a fail concerning the test in the production environment and execute error handling.

Regarding the challenge 1 described above, effects produced by the network service management system 100 of the example will be described. According to the network service management system 100, tests can be automatically conducted in a plurality of environments through a single test template. This helps to improve efficiency of testing conducted on a network service in a plurality of environments. According to the network service management system 100, a test in a test environment is conducted in response to uploading of a bundled file, while a test in a production environment is conducted in response to purchase of a network service. This allows the tests to be conducted in a timely manner from the viewpoint of prompt network service provision.

Regarding the challenge 2 described above, effects produced by the network service management system 100 of the example will be described. According to the network service management system 100, only by uploading a bundled file, a network service vendor can build a network service on a network platform of a telecommunications company and provide the network service to a customer. According to the network service of the example, the network service management system helps a user of the platform service to provide a network service to a customer with less time and effort.

The network service management system 100 of the example includes a manager (the CI/CD assist device 106) to manage building of and testing of a network service in a plurality of environments. This enables building of and testing of the network service in the plurality of the environments in a timely manner. The manager sets data about the test environment in the test template. This helps to automate and improve efficiency of testing in the plurality of the environments.

The present invention has been described through the example. It will be understood by those skilled in the art that the example is illustrative only, constituent elements or combined processes can be modified, and such modified examples are covered by the scope of the present invention.

In the example described above, the test in the sandbox environment is automated. In a modification example, the test in the sandbox environment may be manually conducted by a person in charge at the vendor. The person in charge at the vendor may upload a bundled file including a configuration file template and a test script template concerning a functional unit group from the vendor terminal 16 to the CI/CD assist device 106, on condition that the result of the test on the functional unit group in the sandbox environment is a pass. In this case, the network service management system 100 may, based on the bundled file, automate building of and testing of the network service in the staging and subsequent environments.

In spite of not being described in the example above, the bundled file may further include a parameter file in which a plurality of parameter values such as IP addresses and host names are recorded. The values in the variable field and the environment field of the test script template may be set by referring to values in the parameter file. In this case, with information concerning each environment being put in the parameter file, the CI/CD assist device 106 may set a value in the environment field of the test script template. With information concerning functional unit groups built in the environments being put in the parameter file, the E2EOs 62 of the NOS 102*a*, NOS 102*b*, and NOS 102*c* may each set a value in the variable field of the test script template.

Any combinations of the prerequisite technique, the example, and modification examples described above are also effective as embodiments of the present disclosure. A new embodiment resulting from any of the combinations has effects of the combined constituent elements. It will be understood by those skilled in the art that functions fulfilled by the constituent elements described in claims are implemented by each single element or coordination of the constituent elements shown in the prerequisite technique, the example, and modification examples.

INDUSTRIAL APPLICABILITY

The technique of the present disclosure can be applied to a system that manages a network service.

REFERENCE SIGNS LIST

100 network service management system, 102*a* NOS, 102*b* NOS, 102*c* NOS, 104*a* test device, 104*b* test device, 104*c* test device, 106 CI/CD assist device, 116 bundle accepter, 118 first bundle expander, 120 second bundle expander, 122 third bundle expander

The invention claimed is:

1. A network service management system comprising:
one or more processors comprising hardware, wherein the one or more processors are configured to implement:
an accepter structured to accept a test template comprising information that specifies first test content for a network service, the first test template comprising a variable field, wherein the variable field is an environment field for data concerning a first subject for building of a network function and a second subject for testing of the network function;
a first generator structured to generate first test data that specifies the first test content compatible with a first environment by setting a first value compatible with the first environment in the variable field of the test template;
a first tester structured to conduct a first test on the network service in the first environment by using the first test data generated by the first generator;
a second generator structured to generate second test data that specifies second test content compatible with a second environment different from the first environment by setting a second value compatible with the second environment in the variable field of the test template, wherein the first environment is a test environment while the second environment is a production environment; and
a second tester structured to conduct a second test on the network service in the second environment by using the second test data generated by the second generator.

2. The network service management system according to claim 1, wherein
the first tester conducts a test on the network service in the test environment in an event that the test template is accepted, and
the second tester conducts a test on the network service in the production environment in an event that the network service is purchased by a purchaser.

3. The network service management system according to claim 1, wherein the one or more processors are further configured to implement a manager structured to manage testing both in the first environment and in the second environment, the manager gives the test template to the first generator to enable testing of the network service in the test environment, and the manager, when a test on the network service in the test environment is passed, gives the test template to the second generator to enable testing of the network service in the production environment.

4. The network service management system according to claim 3, wherein the test template includes a specific field in which data about the first generator or the second generator is to be set, and wherein the manager sets data about the first generator in the specific field of the test template given to the first generator, and sets data about the second generator in the specific field of the test template given to the second generator.

5. A network service management method, wherein a computer executes:

accepting a test template comprising information that specifies first test content for a network service, the first test template comprising a variable field, wherein the variable field is an environment field for data concerning a first subject for building of a network function and a second subject for testing of the network function;

generating first test data that specifies the first test content compatible with a first environment by setting a first value compatible with the first environment in the variable field of the test template;

conducting a first test on the network service in the first environment by using the generated first test data regarding the first environment;

generating second test data that specifies second test content compatible with a second environment different from the first environment by setting a second value compatible with the second environment in the variable field of the test template, wherein the first environment is a test environment while the second environment is a production environment; and conducting a test on the network service in the second environment by using the second test data.

6. The network service management system according to claim 1, wherein the variable field includes a field in which a value indicating a position of a cloud-native network function (CNF) is dynamically set.

* * * * *